(12) United States Patent  
Kuboyama

(10) Patent No.: US 8,577,162 B2  
(45) Date of Patent: Nov. 5, 2013

(54) OUTPUT APPARATUS AND OUTPUT METHOD

(75) Inventor: Shouichi Kuboyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 12/805,650

(22) Filed: Aug. 11, 2010

(65) Prior Publication Data

US 2011/0038561 A1    Feb. 17, 2011

(30) Foreign Application Priority Data

Aug. 14, 2009   (JP) ................................. 2009-188094

(51) Int. Cl.
| | |
|---|---|
| G06K 9/46 | (2006.01) |
| G06K 9/00 | (2006.01) |
| G06K 9/42 | (2006.01) |
| G06K 15/00 | (2006.01) |
| H04N 1/40 | (2006.01) |

(52) U.S. Cl.
USPC ........... 382/237; 382/252; 382/256; 382/257; 358/2.99; 358/3.03; 358/3.05

(58) Field of Classification Search
USPC ......... 382/163, 164, 237, 251, 264, 252, 256, 382/257; 358/2.99, 3.03, 3.05
See application file for complete search history.

(56) References Cited

U.S. PATENT DOCUMENTS

| | | | |
|---|---|---|---|
| 5,684,933 A |   | 11/1997 | Nagafusa |
| 5,832,141 A | * | 11/1998 | Ishida et al. .................. 382/298 |
| 5,835,233 A |   | 11/1998 | Otsu et al. |
| 6,264,299 B1 |   | 7/2001 | Noda |
| 7,064,862 B2 | * | 6/2006 | Takashimizu ................. 358/1.9 |
| 7,081,972 B2 | * | 7/2006 | Fukao .......................... 358/3.04 |
| 7,301,673 B2 | * | 11/2007 | Kang ........................... 358/3.03 |
| 7,460,272 B2 | * | 12/2008 | Hara ............................. 358/1.9 |
| 7,532,364 B2 | * | 5/2009 | Miyagi et al. ............... 358/3.13 |
| 8,040,565 B2 |   | 10/2011 | Shibaki et al. |
| 2004/0190029 A1 |   | 9/2004 | Rombola et al. |
| 2009/0074318 A1 | * | 3/2009 | Yoo et al. ..................... 382/260 |

FOREIGN PATENT DOCUMENTS

| | | |
|---|---|---|
| EP | 0689159 A2 | 12/1995 |
| JP | 09-039297 | 2/1997 |
| JP | 2001-034118 | 2/2001 |
| JP | 2002-086805 | 3/2002 |
| JP | 2009-372283 | 2/2009 |

OTHER PUBLICATIONS

European Search Report dated Oct. 20, 2011 issued in corresponding European Patent Application No. 10172831.9.
Japanese Office Action issued Jun. 18, 2013 for corresponding Japanese Application No. 2009-188094.

* cited by examiner

*Primary Examiner* — Anand Bhatnagar
*Assistant Examiner* — Soo Park
(74) *Attorney, Agent, or Firm* — Staas & Halsey LLP

(57) ABSTRACT

An output apparatus determines pixels that form an area equal to or greater than a predetermined size and whose pixel values are not different from pixel values of neighboring pixels, and pixels that form an area not equal to or greater than the predetermined size. The apparatus reduces the pixel values of the determined pixels and outputs a binary image formed by the determined pixels with the reduced pixel values.

7 Claims, 21 Drawing Sheets

FIG.5

| $P_1$ | $P_2$ | $P_3$ |
|---|---|---|
| $P_4$ | O | $P_5$ |
| $P_6$ | $P_7$ | $P_8$ |

FIG.6

| | | | | | | | | | | | | | | | | | | |
|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 10 | 20 | 30 | 30 | 30 | 30 | 20 | 10 | 0 | 0 | 0 | 0 | 0 | 0 | 0 | 0 |
| 0 | 0 | 0 | 20 | 40 | 60 | 60 | 60 | 60 | 60 | 40 | 20 | 0 | 10 | 10 | 10 | 0 | 0 | 0 |
| 0 | 0 | 0 | 30 | 60 | 90 | 90 | 90 | 90 | 90 | 60 | 30 | 0 | 10 | 10 | 10 | 0 | 0 | 0 |
| 0 | 0 | 0 | 30 | 60 | 90 | 90 | 90 | 90 | 90 | 60 | 30 | 0 | 10 | 10 | 10 | 0 | 0 | 0 |
| 0 | 0 | 0 | 30 | 60 | 90 | 90 | 80 | 70 | 60 | 40 | 20 | 0 | 0 | 0 | 0 | 0 | 0 | 0 |
| 0 | 0 | 0 | 30 | 60 | 90 | 90 | 70 | 50 | 30 | 20 | 10 | 0 | 0 | 0 | 0 | 0 | 0 | 0 |
| 0 | 0 | 0 | 30 | 60 | 90 | 90 | 60 | 30 | 0 | 0 | 0 | 10 | 20 | 20 | 10 | 0 | 0 | 0 |
| 0 | 0 | 0 | 30 | 60 | 90 | 90 | 60 | 30 | 0 | 0 | 0 | 20 | 30 | 30 | 10 | 0 | 0 | 0 |
| 0 | 0 | 0 | 30 | 60 | 90 | 90 | 60 | 30 | 0 | 0 | 0 | 20 | 30 | 30 | 10 | 0 | 0 | 0 |
| 0 | 0 | 0 | 30 | 60 | 90 | 90 | 70 | 50 | 30 | 30 | 30 | 20 | 10 | 10 | 0 | 0 | 0 | 0 |
| 0 | 0 | 0 | 30 | 60 | 90 | 90 | 80 | 70 | 60 | 60 | 60 | 40 | 20 | 0 | 0 | 0 | 0 | 0 |
| 0 | 0 | 0 | 30 | 60 | 90 | 90 | 90 | 90 | 90 | 90 | 90 | 60 | 30 | 0 | 0 | 0 | 0 | 0 |
| 0 | 0 | 0 | 30 | 60 | 90 | 90 | 90 | 90 | 90 | 90 | 90 | 60 | 30 | 0 | 0 | 0 | 0 | 0 |
| 0 | 0 | 0 | 30 | 60 | 90 | 90 | 90 | 90 | 90 | 90 | 90 | 60 | 30 | 0 | 0 | 0 | 0 | 0 |
| 0 | 0 | 0 | 20 | 40 | 60 | 60 | 60 | 60 | 60 | 60 | 60 | 40 | 20 | 0 | 0 | 0 | 0 | 0 |
| 0 | 0 | 0 | 10 | 20 | 30 | 30 | 30 | 30 | 30 | 30 | 30 | 20 | 10 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |

FIG.7

| 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|
| 0 | 0 | 10 | 30 | 60 | 80 | 90 | 90 | 80 | 60 | 30 | 10 | 0 | 0 | 0 | 0 | 0 | 0 | 0 |
| 0 | 0 | 30 | 100 | 140 | 170 | 180 | 180 | 180 | 170 | 140 | 100 | 40 | 20 | 30 | 20 | 10 | 0 | 0 |
| 0 | 0 | 60 | 140 | 180 | 180 | 180 | 180 | 180 | 180 | 180 | 140 | 80 | 50 | 30 | 50 | 20 | 0 | 0 |
| 0 | 0 | 80 | 170 | 180 | 170 | 90 | 90 | 90 | 170 | 180 | 170 | 110 | 30 | 0 | 30 | 30 | 0 | 0 |
| 0 | 0 | 90 | 180 | 180 | 90 | 10 | 30 | 60 | 160 | 180 | 170 | 100 | 50 | 30 | 50 | 20 | 0 | 0 |
| 0 | 0 | 90 | 180 | 180 | 90 | 30 | 100 | 140 | 170 | 180 | 140 | 70 | 20 | 30 | 20 | 10 | 0 | 0 |
| 0 | 0 | 90 | 180 | 180 | 90 | 60 | 140 | 180 | 170 | 140 | 100 | 40 | 30 | 50 | 50 | 30 | 10 | 0 |
| 0 | 0 | 90 | 180 | 180 | 90 | 80 | 170 | 180 | 160 | 60 | 30 | 40 | 90 | 90 | 100 | 80 | 20 | 0 |
| 0 | 0 | 90 | 180 | 180 | 90 | 90 | 180 | 180 | 90 | 0 | 0 | 50 | 90 | 60 | 80 | 80 | 30 | 0 |
| 0 | 0 | 90 | 180 | 180 | 90 | 80 | 170 | 180 | 170 | 90 | 80 | 110 | 70 | 70 | 110 | 80 | 20 | 0 |
| 0 | 0 | 90 | 180 | 180 | 90 | 60 | 140 | 180 | 180 | 180 | 170 | 110 | 80 | 90 | 80 | 50 | 10 | 0 |
| 0 | 0 | 90 | 180 | 180 | 90 | 30 | 100 | 140 | 170 | 180 | 180 | 170 | 120 | 90 | 20 | 10 | 0 | 0 |
| 0 | 0 | 90 | 180 | 180 | 90 | 10 | 30 | 60 | 80 | 90 | 170 | 180 | 170 | 80 | 0 | 0 | 0 | 0 |
| 0 | 0 | 90 | 180 | 180 | 90 | 0 | 0 | 0 | 0 | 90 | 180 | 180 | 90 | 0 | 0 | 0 | 0 | 0 |
| 0 | 0 | 80 | 170 | 180 | 170 | 90 | 90 | 90 | 90 | 170 | 180 | 170 | 80 | 0 | 0 | 0 | 0 | 0 |
| 0 | 0 | 60 | 140 | 180 | 180 | 180 | 180 | 180 | 180 | 180 | 180 | 140 | 60 | 0 | 0 | 0 | 0 | 0 |
| 0 | 0 | 30 | 100 | 140 | 170 | 180 | 180 | 180 | 180 | 180 | 170 | 140 | 100 | 30 | 0 | 0 | 0 | 0 |
| 0 | 0 | 10 | 30 | 60 | 80 | 90 | 90 | 90 | 90 | 90 | 80 | 60 | 30 | 10 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 |

FIG.8

| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 1 | 1 | 1 | 1 | 1 | 1 | 0 | 0 | 0 | 0 | 0 | 0 | 0 | 0 | 0 | 0 |
| 0 | 0 | 0 | 0 | 1 | 2 | 6 | 6 | 6 | 2 | 1 | 0 | 0 | 0 | 10 | 0 | 0 | 0 | 0 | 0 |
| 0 | 0 | 0 | 0 | 1 | 6 | 10 | 9 | 7 | 2 | 1 | 0 | 0 | 0 | 0 | 0 | 0 | 0 | 0 | 0 |
| 0 | 0 | 0 | 0 | 1 | 6 | 9 | 5 | 3 | 2 | 1 | 0 | 0 | 0 | 0 | 0 | 0 | 0 | 0 | 0 |
| 0 | 0 | 0 | 0 | 1 | 6 | 7 | 3 | 0 | 0 | 0 | 0 | 0 | 0 | 0 | 0 | 0 | 0 | 0 | 0 |
| 0 | 0 | 0 | 0 | 1 | 6 | 6 | 2 | 0 | 0 | 0 | 0 | 0 | 0 | 0 | 0 | 0 | 0 | 0 | 0 |
| 0 | 0 | 0 | 0 | 1 | 6 | 6 | 1 | 0 | 0 | 0 | 0 | 0 | 7 | 6 | 0 | 0 | 0 | 0 | 0 |
| 0 | 0 | 0 | 0 | 1 | 6 | 6 | 2 | 0 | 0 | 0 | 0 | 0 | 7 | 0 | 0 | 0 | 0 | 0 | 0 |
| 0 | 0 | 0 | 0 | 1 | 6 | 7 | 3 | 0 | 0 | 0 | 0 | 0 | 0 | 0 | 0 | 0 | 0 | 0 | 0 |
| 0 | 0 | 0 | 0 | 1 | 6 | 9 | 5 | 3 | 2 | 1 | 1 | 2 | 0 | 0 | 0 | 0 | 0 | 0 | 0 |
| 0 | 0 | 0 | 0 | 1 | 6 | 10 | 9 | 7 | 6 | 6 | 2 | 1 | 0 | 0 | 0 | 0 | 0 | 0 | 0 |
| 0 | 0 | 0 | 0 | 1 | 6 | 10 | 10 | 10 | 10 | 10 | 6 | 1 | 0 | 0 | 0 | 0 | 0 | 0 | 0 |
| 0 | 0 | 0 | 0 | 1 | 2 | 6 | 6 | 6 | 6 | 6 | 2 | 1 | 0 | 0 | 0 | 0 | 0 | 0 | 0 |
| 0 | 0 | 0 | 0 | 1 | 1 | 1 | 1 | 1 | 1 | 1 | 1 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |

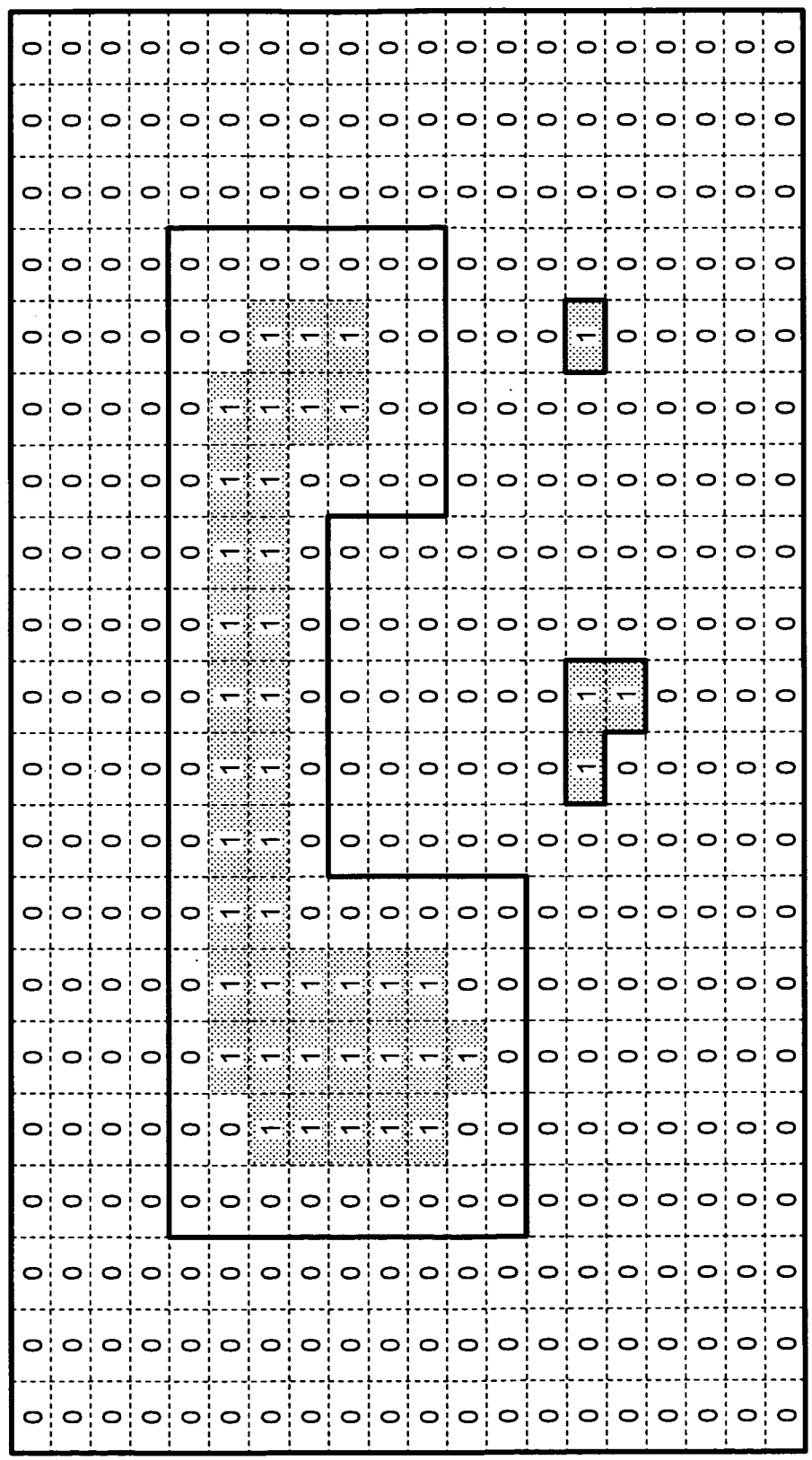

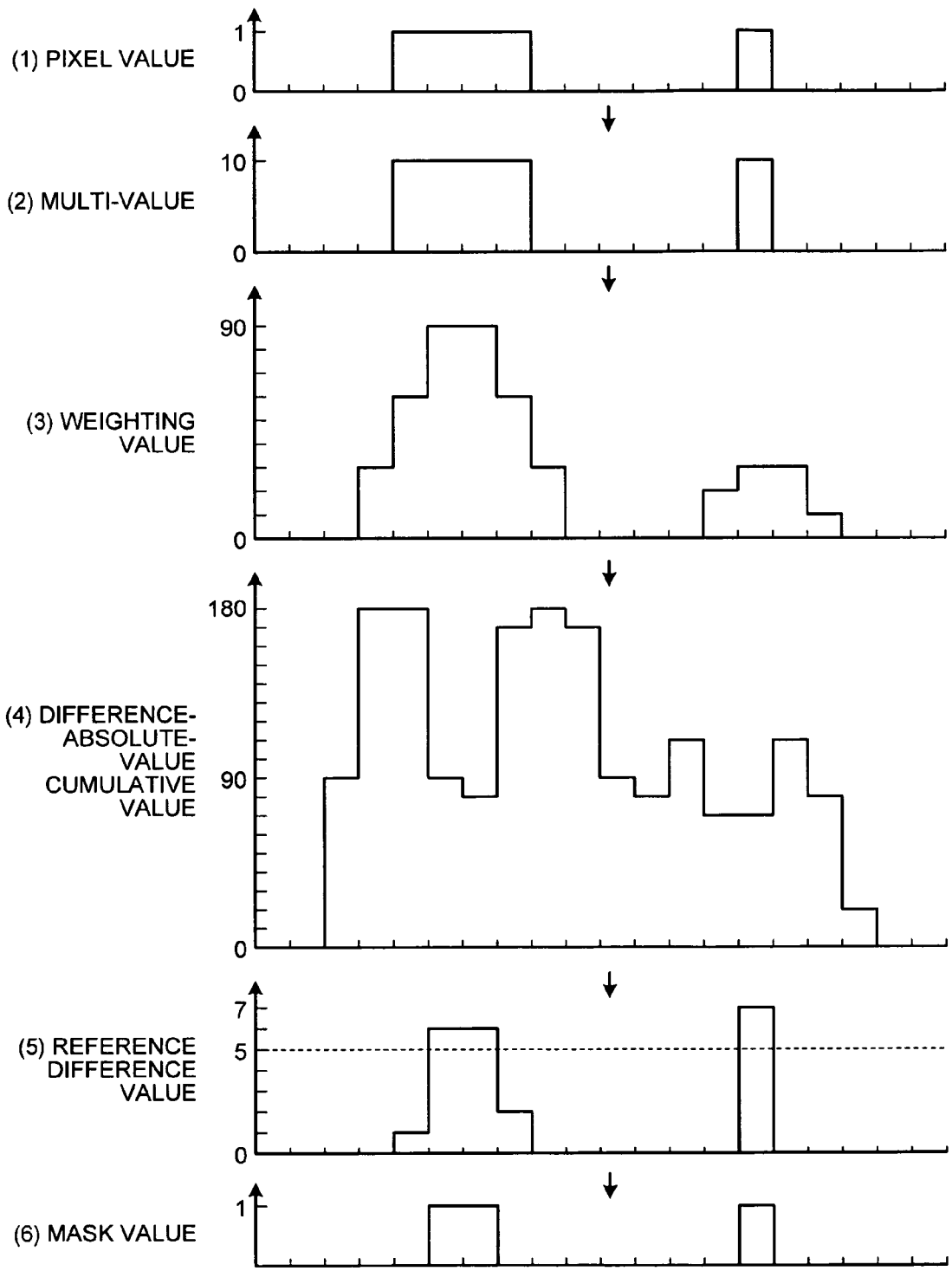

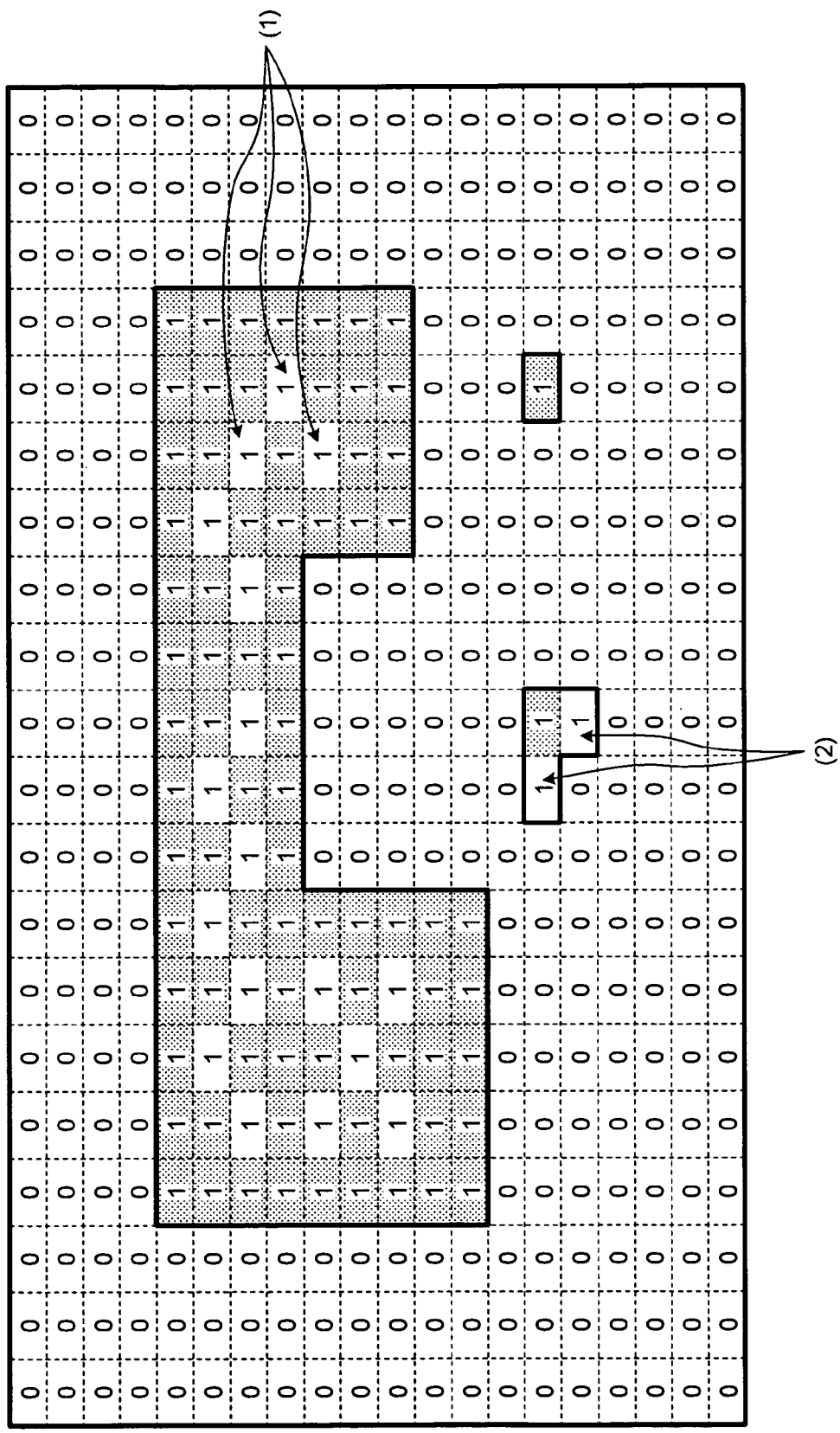

| TARGET REDUCTION RATIO | RAIL NUMBER | ACTUAL REDUCTION RATIO |
|---|---|---|
| 20% | 1 | 15% |
| | 2 | |
| | 3 | |
| | 4 | |

OUTPUT APPARATUS AND OUTPUT METHOD

CROSS-REFERENCE TO RELATED APPLICATION

This application is based upon and claims the benefit of priority of the prior Japanese Patent Application No. 2009-188094, filed on Aug. 14, 2009, the entire contents of which are incorporated herein by reference.

FIELD

The embodiments discussed herein are directed to an output apparatus and an output method.

BACKGROUND

Printing machines consume toner or ink when printing characters and images. A printing machine prints a gray area by scattering the small dots each having a width corresponding to multiple pixels on a white background. Reduction in consumption of toner or ink leads to a reduction in the number of times toner or ink is replaced. Toner contains polyester resin that is manufactured from oil. Reduction in the consumption of toner leads to a reduction in oil consumption.

There are conventional methods of reducing the amount of toner or ink that is consumed by printing machines. For example, there are reduction methods for uniformly reducing the amount of toner or ink that is consumed by a printing machine. In addition, for example, there are adjustment methods for adjusting the intensity of pixels, excluding the pixels in an edge, out of the pixels that are contained in image data.
Patent Document: Japanese Laid-open Patent Publication No. 2002-86805

However, the above-described methods have drawbacks in that image quality is decreased and the consumption of toner or ink cannot actually be reduced. For example, in the above-described reduction method, uniform reduction in the consumption of toner or ink leads to blurring of characters or images, which reduces the image quality. For example, in the above-described adjustment methods, most of the small dots in a gray area correspond to an edge and accordingly there are no pixels that can be adjusted in the gray area; therefore, the consumption of toner or ink cannot actually be reduced.

SUMMARY

According to an aspect of an embodiment of the invention, an information processing apparatus includes a determining unit that determines first pixels and second pixels, out of pixels that form a binary image, the first pixels forming an area equal to or greater than a predetermined size and having pixel values not different from pixel values of neighboring pixels, the second pixels forming an area not equal to or greater than the predetermined size; an output unit that reduces the pixel values of the first pixels and the second pixels, and outputs the binary image with the reduced pixel values.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram illustrating a predetermined number of neighboring pixels in the second embodiment;

FIG. 6 is a diagram illustrating an example of data after calculation of weighting values in the second embodiment;

FIG. 7 is a diagram illustrating an example of data after calculation of difference-absolute-value cumulative values in the second embodiment;

FIG. 8 is a diagram illustrating an example of data after calculation of reference difference values in the second embodiment;

FIG. 9 is a diagram illustrating an example of data after reduction pixels candidates are determined in the second embodiment;

FIG. 10B is a diagram illustrating a process that is performed by the reduction pixel candidate determining unit in the second embodiment;

FIG. 11A is a diagram illustrating an example of a pattern in a case in which a disperse rearrangement method is used;

FIG. 11B is a diagram illustrating an example of a pattern in a case in which a disperse rearrangement method is used;

FIG. 11C is a diagram illustrating an example of a pattern in a case in which a disperse rearrangement method is used;

FIG. 11D is a diagram illustrating an example of a pattern in a case in which a disperse rearrangement method is used;

FIG. 12B is a diagram further illustrating the process of determining reduction pixels in the second embodiment;

DESCRIPTION OF EMBODIMENTS

Preferred embodiments of the present invention will be explained with reference to accompanying drawings. The embodiments do not limit the disclosed invention. The embodiments can be arbitrarily combined unless it causes a contradiction in the process contests.

[a] First Embodiment

Figure 1:
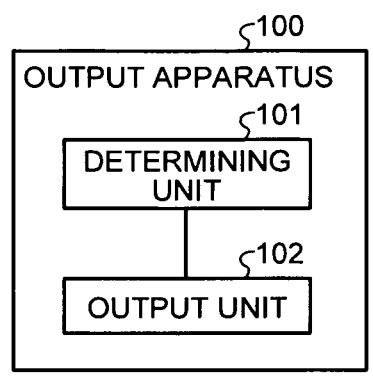
FIG. 1 is a block diagram illustrating an example of a configuration of an output apparatus according to a first embodiment of the present invention.

An example of a configuration of an output apparatus 100 according to a first embodiment of the present invention will be explained below with reference to FIG. 1. FIG. 1 is a block diagram illustrating an example of the configuration of the output apparatus according to the first embodiment. In the example illustrated in FIG. 1, the output apparatus 100 includes a determining unit 101 and an output unit 102.

The determining unit 101 determines, out of the pixels that form the binary image, pixels whose pixel values are to be reduced. Such pixels are called reduction pixels. Pixels that are determined to be reduction pixels are pixels that form an area equal to or greater than a predetermined size and whose pixel values are not different from those of neighboring pixels and pixels that form an area not equal to or greater than the predetermined size. The output unit 102 reduces the pixel values of the pixels that are determined by the determining unit 101 and outputs a binary image with the reduced pixel values.

Accordingly, the output apparatus 100 according to the first embodiment can maintain image quality and reduce the consumption of toner. In other words, the output apparatus 100 according to the first embodiment reduces the intensity of pixels, excluding the pixels at the edge, out of the pixels that form an area equal to or greater than a predetermined size. Accordingly, in the first embodiment, the edge remains and the image quality can be maintained even if consumption of toner or ink is reduced.

The neutral color in a binary image is represented by scattered small dots with the width of each of multiple pixels. Most of the pixels that form each area of small dots correspond to an edge. Thus, the output apparatus 100 according to the first embodiment reduces the intensity of pixels that form such an area of small dots, which is an area less than or greater than a predetermined size. Accordingly, in the first embodiment, the intensity of pixels for forming a gray area can be reduced, which reduces consumption of toner.

[b] Second Embodiment

Configuration of Output Apparatus According to Second Embodiment

Figure 2:
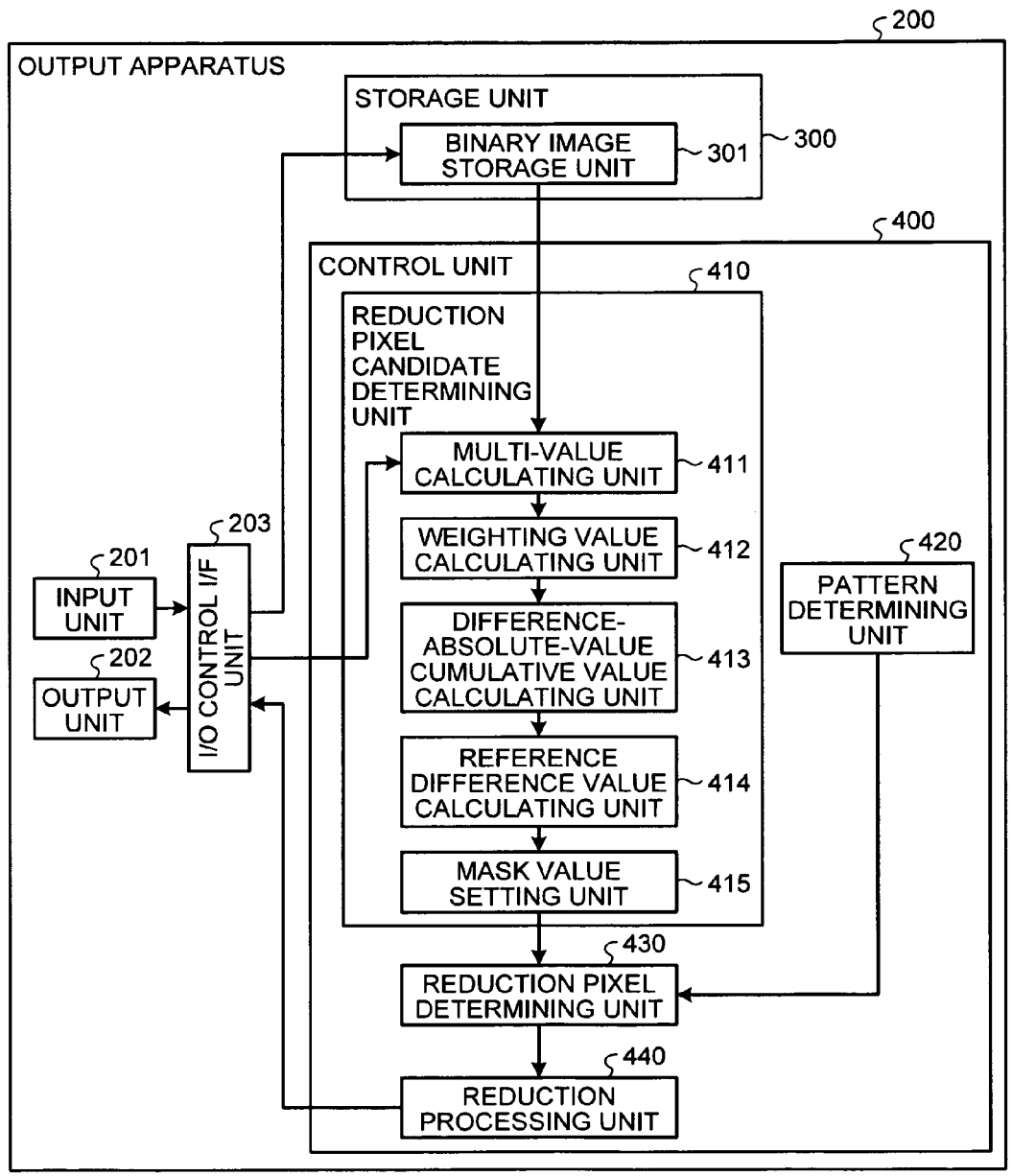
FIG. 2 is a block diagram illustrating an example of a configuration of an output apparatus according to a second embodiment of the present invention.

An output apparatus 200 according to a second embodiment of the present invention will be explained below. First, an example of the configuration of the output apparatus 200 according to the second embodiment will be explained below with reference to FIG. 2. FIG. 2 is a block diagram illustrating an example of the configuration of the output apparatus according to the second embodiment. In the example illustrated in FIG. 2, the output apparatus 200 includes an input unit 201, an output unit 202, an input/output (I/O) control interface (I/F) control unit 203, a storage unit 300, and a control unit 400.

The input unit 201 is connected to the I/O control I/F unit 203. The input unit 201 receives, from a user, a binary image and a reduction instruction for reducing pixel values in the binary image and sends the received reduction instruction and the binary image to the I/O control I/F unit 203. For example, the input unit 201 includes a keyboard, a mouse, and a microphone and receives the reduction instruction directly from the user. Furthermore, for example, the input unit 201 includes an input terminal for receiving information via a wired or wireless network and receives a binary image and a reduction instruction from a device other than the output apparatus 200. In addition, for example, the input unit 201 includes an input interface (such as a flexible disk (FD) insertion port or a USB terminal insertion port) for receiving information directly from the user and receives a binary image directly from the user.

The output unit 202 is connected to the I/O control I/F unit 203. The output unit 202 receives a binary image from the I/O control I/F unit 203 and outputs the binary image to an image printing apparatus, such as a printer or a multifunction machine. For example, the output unit 202 includes an output terminal for outputting information and outputs the binary image to the image printing apparatus, such as a printer or a multifunction machine. As described below, binary images that are output by the output unit 202 are binary images with pixel values that have been reduced by the control unit 400.

The input terminal and the output terminal correspond to terminals or antennae for, for example, a short-distance wireless network, such as Bluetooth, a local area network (LAN), a wireless LAN, or a universal serial bus (USB). The input terminal and the output interface are connected to, for example, various drivers for storing information in or reading information from a magnetic medium or an optical disk.

The I/O control I/F unit 203 is connected to the input unit 201, the output unit 202, the storage unit 300, and the control unit 400. The I/O control I/F unit 203 performs a process for relaying various types of information between the input unit 201 and the storage unit 300 or between the input unit 201 and the control unit 400. The I/O control I/F unit 203 performs a process for relaying various types of information that is communicated between the control unit 400 and the output unit 202.

The relay process that is performed by the I/O control I/F unit 203 will be explained here briefly. Upon receiving a binary image from the input unit 201, the I/O control I/F unit 203 stores the received binary image in the storage unit 300. Upon receiving a reduction instruction from the input unit 201, the I/O control I/F unit 203 sends the received reduction instruction to the control unit 400. Upon receiving the binary image with reduced pixel values from the control unit 400, the I/O control I/F unit 203 sends the received binary image to the output unit 202.

The storage unit 300 is connected to the I/O control I/F unit 203 and the control unit 400. The storage unit 300 stores data that is used for various processes that are performed by the control unit 400. The storage unit 300 is a semiconductor memory device, such as a random access memory (RAM), a read only memory (ROM), and a flash memory, or a storage device such as a hard disk or an optical disk. In the example illustrated in FIG, the storage unit 300 includes a binary image storage unit 301.

The binary image storage unit 301 stores binary images. A "binary image" is an image in which the pixel value of each of the pixels that form an image is "0" or "1". For example, if "0" represents "white" and "1" represents "black", the "binary image" is an image that is represented by the two colors "white" and "black". In a binary image, a neutral color is represented by scattering the small dots with the width of multiple pixels. For example, to express gray in a binary image, pixels whose pixel values represent "1" are scattered in small dots with the width of multiple pixels in an image area in which pixels whose pixel values represent "0" are concentrated.

Figure 3:
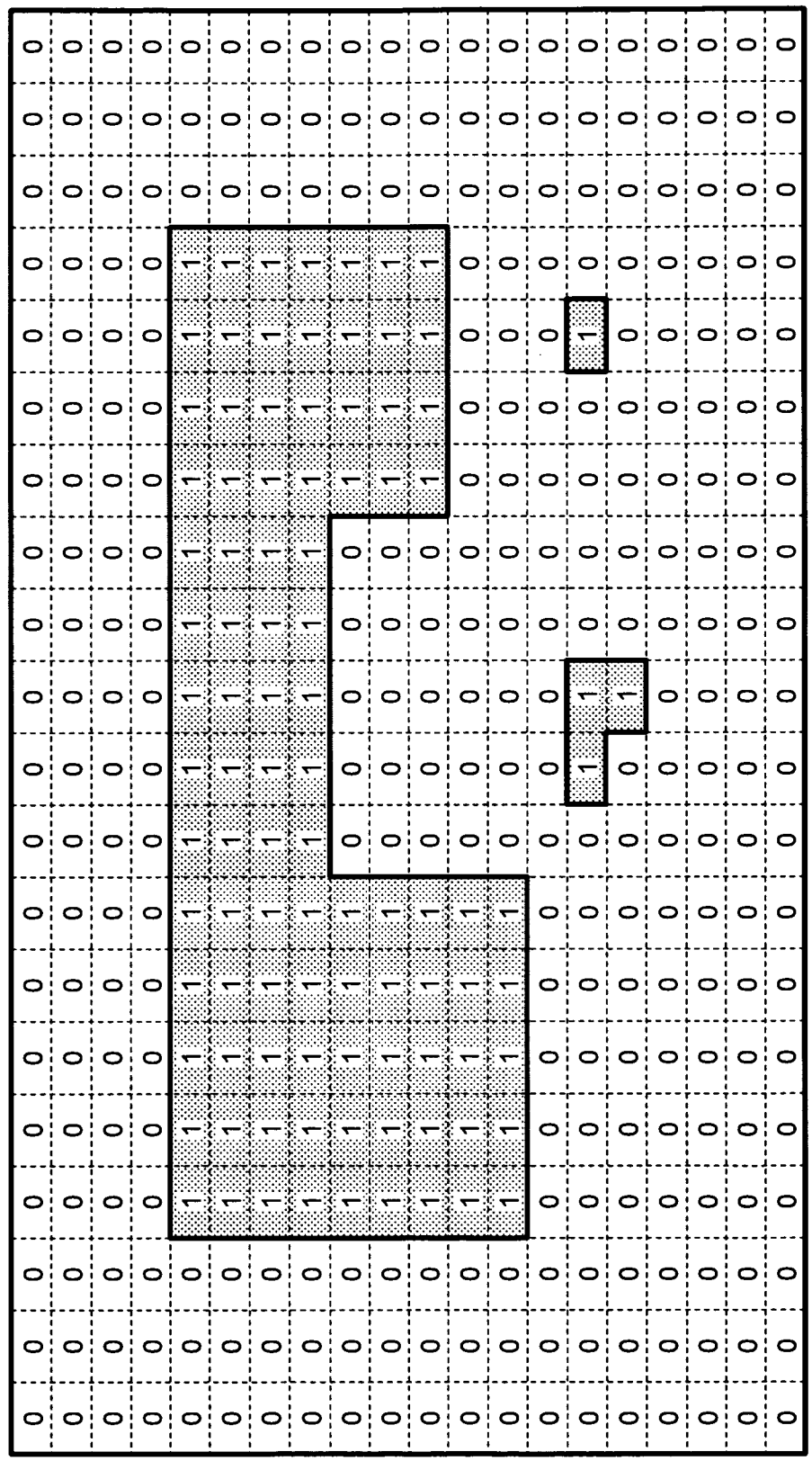
FIG. 3 is a diagram illustrating an example of a binary image.

An example of a binary image will be explained here with reference to FIG. 3. FIG. 3 is a diagram illustrating an example of a binary image. Each rectangle illustrated in FIG.

3 corresponds to a pixel. In addition, the value on each rectangle represents the pixel value of that pixel. The pixel value of "0" represents "white" and the pixel value of "1" represents "black".

Hereinafter, explanation will be given using an example in which the image printing apparatus prints black ink or toner for the pixels whose pixel values are "1" and does not prints ink or toner for the pixels whose pixel values are "0". In this case, the color of the pixels whose pixel values are "0" is the color of a paper sheet on which toner or ink is printed (white). Thus, pixel values of pixels that are "1" are to be reduced.

A case will be explained below in which the "pixels whose pixel values may be reduced" are pixels whose pixel values are "1". However, the present invention is not limited to this. Pixels whose pixel values are "0" may be "pixels whose pixel values may be reduced". This applies, for example, to a case in which an image printing apparatus prints "white" using toner or ink on a black paper sheet. More specifically, this applies to a case in which the image printing apparatus does not print ink or toner for pixels whose pixel values are "1" and prints white toner or ink for pixels whose pixel values are "0".

The binary image that is stored in the binary image storage unit 301 is stored by the I/O control I/F unit 203. The binary image that is stored in the binary image storage unit 301 is read by the control unit 400.

The control unit 400 is connected to the I/O control I/F unit 203 and the storage unit 300. The control unit 400 includes an internal memory for storing programs that define various process procedures and performs various reception control processes. The control unit 400 is an integrated circuit, such as an application specific integrated circuit (ASIC) and a field programmable gate array (FPGA), or an electric circuit, such as a central processing unit (CPU) and a micro processing unit (MPU). In the example illustrated in FIG. 2, the control unit 400 includes a reduction pixel candidate determining unit 410, a pattern determining unit 420, a reduction pixel determining unit 430, and a reduction processing unit 440.

The reduction pixel candidate determining unit 410 determines candidates for reduction pixels whose pixel values are to be reduced (reduction-pixel candidates) out of the pixels that form the binary image. In the case illustrated in FIG. 2, the reduction pixel candidate determining unit 410 includes a multi-value calculating unit 411, a weighting value determining unit 412, a difference-absolute-value cumulative value calculating unit 413, a reference difference value calculating unit 414, and a mask value setting unit 415.

Upon receiving the reduction instruction from the I/O control I/F unit 203, the multi-value calculating unit 411 reads the binary image from the binary image storage unit 301. The multi-value calculating unit 411 then performs a multi-value process on each of the pixels that form the binary image. Specifically, the multi-value calculating unit 411 calculates, for each of the pixels that form the binary image, a "multi-value" that is obtained by multiplying a pixel value by a predetermined value. For example, when "10" is used as the predetermined value, the multi-value calculating unit 411 calculates a multi-value of "10" for a pixel whose pixel value is "1" and calculates a multi-value of "0" for a pixel whose pixel value is "0".

Figure 4:
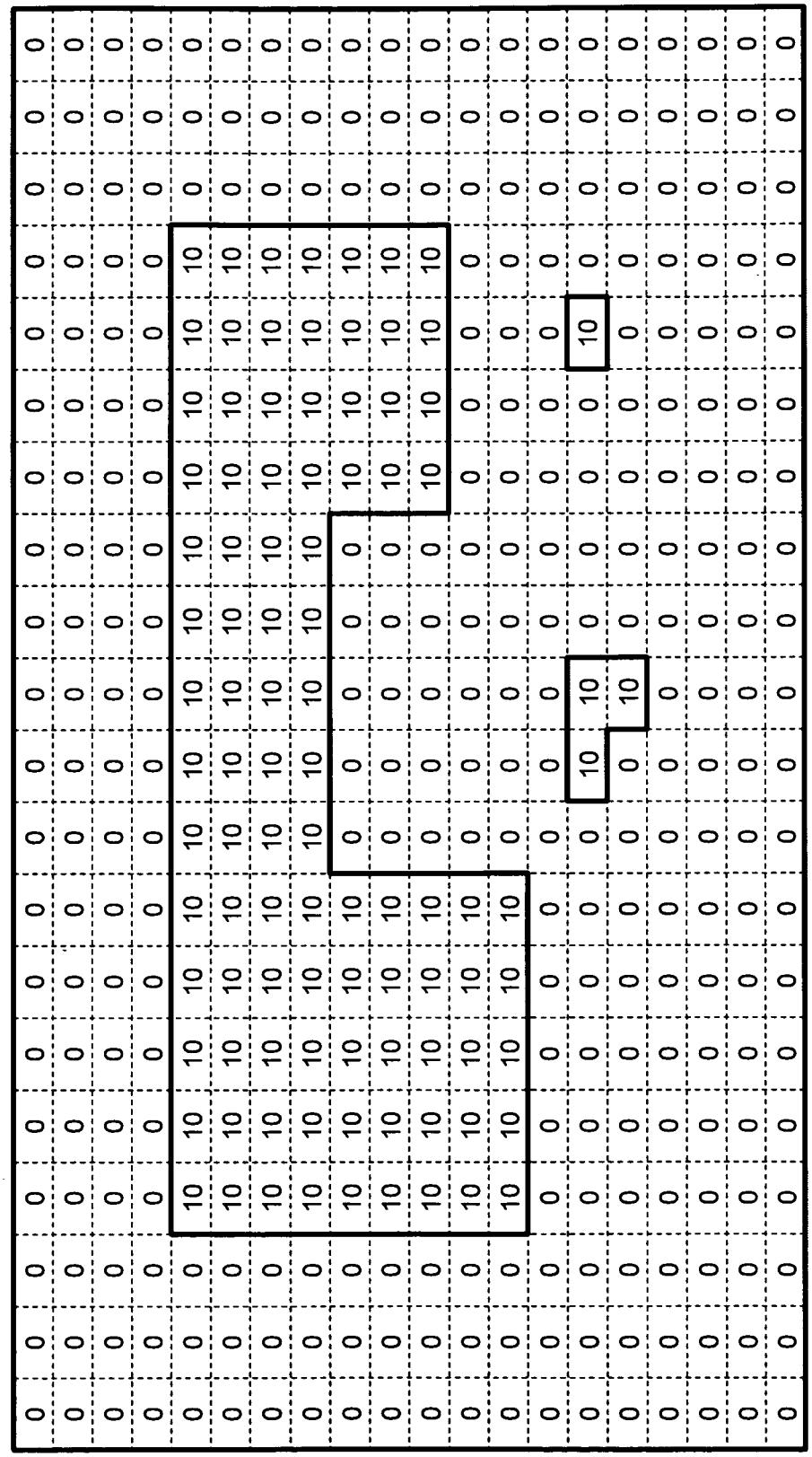
FIG. 4 is a diagram illustrating an example of data on which a multi-value process has been performed in the second embodiment.

For example, the multi-value calculating unit 411 performs the multi-value process on the binary image illustrated in FIG. 3 so that the data illustrated in FIG. 4 is obtained. FIG. 4 is a diagram illustrating an example of data on which the multi-value process has been performed in the second embodiment. Each rectangle illustrated in FIG. 4 corresponds to a pixel. Each value on each rectangle illustrated in FIG. 4 represents a multi-value that is calculated by the multi-value calculating unit 411.

The weighting value calculating unit 412 calculates, for each of the pixels that form the binary image, a "weighting value" such that weighting values for pixels that form a large area are larger than those for pixels that form a small area. Specifically, the weighting value calculating unit 412 calculates, for each of the pixels that form the binary image, a weighting value by calculating a sum obtained by summing a multi-value of a pixel of interest and multi-values of a predetermined number of pixels neighboring the pixel of interest. The "weighting value" is also referred to as a "first value".

Hereinafter, unless the context clearly dictates otherwise, explanation will be provided using an example in which pixels that can be covered by a size of 3×3 around the pixel of interest are used as the predetermined number of neighboring pixels. Hereinafter, explanation will be provided using an example in which, as the predetermined number of neighboring pixels, pixels that are covered by a filter having a size of 3×3 are used. However, the present invention is not limited to this. For example, pixels that are covered by a filter larger than "3×3" may be used. Specifically, if the performance of the image printing machine is low, pixels covered by a large size may be used as the predetermined number of neighboring pixels.

Figure 5:
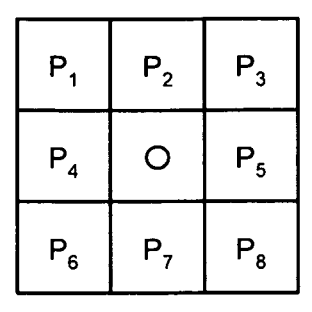

The predetermined number of neighboring pixels will be further explained with reference to FIG. 5. FIG. 5 is a diagram illustrating the predetermined number of neighboring pixels in the second embodiment. Each rectangle illustrated in FIG. 5 corresponds to a pixel. Explanation will be provided using an example in which the rectangle with "o" illustrated in FIG. 5 is the pixel of interest.

In this case, the weighting value calculating unit 412 calculates, for each of the pixels that form the binary image, a sum of pixel values by summing the multi-values of pixels within the one-pixel width surrounding the pixel of interest. For example, the weighting value at the position of "o" illustrated in FIG. 5 is represented by the following Equation (1).

(weighting value at position of "o"=(multi-value of "o"+multi-value of P1+multi-value of P2+multi-value of P3+multi-value of P4+multi-value of P5+multi-value of P6+multi-value of P7+multi-value of P8)  (1)

For example, the weighting value calculating unit 412 calculates weighting values for the data represented in FIG. 4 so that the data represented in FIG. 6 is obtained. FIG. 6 is a diagram illustrating an example of data after the calculation of weighting values in the second embodiment. Each rectangle illustrated in FIG. 6 corresponds to a pixel. The values on the rectangles illustrated in FIG. 6 represent the multi-values that are calculated by the weighting value calculating unit 412. For example, when the multi-value of the pixel of interest illustrated in FIG. 4 is "10" and the multi-values of all the pixels that can be covered by a the size of 3×3 are "10", the multi-value calculating unit 411 calculates a weighting value of "90", as illustrated in FIG. 6. Like this case, the weighting values for pixels other than an edge, out of the pixels that form a certain area, tend to be larger than the weighting values for the pixels in the position corresponding to an edge. In addition, weighting values for pixels that form an area larger than the area (3×3) that is used as an area containing neighboring pixels tend to be larger than the weighting values for pixels that form an area not larger than that area (3×3).

The difference-absolute-value cumulative value calculating unit 413 calculates, for each of the pixels that form the binary image, a "difference-absolute-value cumulative value" such that a difference-absolute-value cumulative value for a pixel that has a weighting value that has a large difference with respect to the weighting values of the neighboring pixels is larger than a difference-absolute-value cumulative value for a pixel that has a weighting value that has a small difference with respect to the weighting values of the neighboring pixels. The "difference-absolute-value cumulative value" is also referred to as a "second value".

Specifically, the difference-absolute-value cumulative value calculating unit 413 calculates, for each of the pixels that form the binary image, an absolute value of a difference value between the weighting value of a pixel of interest and each of the weighting values of the predetermined number of neighboring pixels. The difference-absolute-value cumulative value calculating unit 413 sums the absolute values of the difference values to calculate a "difference-absolute-value cumulative value". For example, a difference-absolute-value cumulative value at the position of "o" is represented by the following Equation (2).

$$\begin{aligned}&(\text{difference-absolute-value cumulative value at position of ``}o\text{''}) = |\text{weighting value of }P1 - \text{weighting value of ``}o\text{''}| + |\text{weighting value of }P2 - \text{weighting value of ``}o\text{''}| + |\text{weighting value of }P3 - \text{weighting value of ``}o\text{''}| + |\text{weighting value of }P4 - \text{weighting value of ``}o\text{''}| + |\text{weighting value of }P5 - \text{weighting value of ``}o\text{''}| + |\text{weighting value of }P6 - \text{weighting value of ``}o\text{''}| + |\text{weighting value of }P7 - \text{weighting value of ``}o\text{''}| + |\text{weighting value of }P8 - \text{weighting value of ``}o\text{''}|\end{aligned} \quad (2)$$

When the difference-absolute-value cumulative value calculating unit 413 calculates difference-absolute-value cumulative values for the data illustrated in FIG. 6, the data illustrated in FIG. 7 is obtained. FIG. 7 is a diagram illustrating an example of data after the calculation of the difference-absolute-value cumulative values. Each rectangle illustrated in FIG. 7 corresponds to a pixel. The values on the respective rectangles illustrated in FIG. 7 each represent a difference-absolute-value cumulative value that is calculated by the difference-absolute-value cumulative value calculating unit 413. For example, if the multi-value of the pixel of interest illustrated in FIG. 6 is "90" and the multi-values of the pixels covered the size of 3×3 are all "90", the difference-absolute-value cumulative value calculating unit 413 calculates a difference-absolute-value cumulative value of "0".

As illustrated in FIG. 7, the difference-absolute-value cumulative value calculating unit 413 calculates, as "difference-absolute-value cumulative values" for pixels, out of the pixels forming the binary image, in the edge of an area that is larger than the size (3×3) used as an area containing the neighboring pixels, values that are larger than "difference-absolute-value cumulative values" for pixels of the large area excluding the edge and pixels of an area that is smaller than the size that is used as an area containing neighboring pixels.

The reference difference value calculating unit 414 calculates a "reference difference value" for determining whether each of the pixels, which form the binary image, is a candidate for a reduction pixel whose pixel value is to be reduced. Specifically, the reference difference value calculating unit 414 calculates a "reference difference value" by calculating a value for a difference value between a multi-value and a difference-absolute-value cumulative value. For example, the difference-absolute-value cumulative value at the position "o" is represented by the following Equation (3).

$$\begin{aligned}&(\text{reference difference value at position of ``}o\text{''}) = (\text{multi-value at position of ``}o\text{''}) - G \times (((\text{difference-absolute-value cumulative value}) \times (\text{multi-value at position of ``}o\text{''}))/100)\end{aligned} \quad (3)$$

where G=influence coefficient (for example, G=0.5).

The significance of the process that is performed by the reference difference value calculating unit 414 will be further explained here. For example, the difference-absolute-value cumulative value is larger for a pixel that has a weighting value that is larger than those of the neighboring pixels. In the example illustrated in FIG. 7, the difference-absolute-value cumulative value calculating unit 413 calculates, for the pixels whose pixel values are "1" and that are adjacent to the pixels whose pixel values are "0" and for pixels whose pixel values are "0" and that are adjacent to the pixels whose pixel values of "1", difference-absolute-value cumulative values that are larger than those for other pixels.

When the reduction pixel determining unit 430 determines candidates for pixels whose pixel values are to be reduced using the difference-absolute-value cumulative values, pixels other than "the pixels whose pixels values may be reduced" may be determined as reduction pixel candidates. In other words, the reduction pixel determining unit 430 may determine that a pixel whose pixel value is "0" is a reduction-pixel candidate. On the basis of this fact, the reference difference value calculating unit 414 calculates a "reference difference value" as a process for preventing pixels other than "pixels whose pixel values may be reduced" from being reduction pixel candidates.

Further explanation will be provided using Equation (3). In Equation (3), the value obtained by multiplying "(difference-absolute-value cumulative value)×(multi-value at position of 'o')" by "G/100" is subtracted from (multi-value at position of "o"). As described, the multi-value calculating unit 411 calculates multi-values of "0" for the pixels whose pixel values are "0". As a result, "multi-value at position of 'o'" is "0" and the value of "(difference-absolute-value cumulative value at position o)×(multi-value at position of 'o')" is "0" accordingly. In other words, the reference difference value calculating unit 414 calculates reference difference values of "0" for the pixels whose pixel values are "0". In other words, pixels that have a reference difference that is a value other than "0" are pixels whose pixel values are "1". Accordingly, as described below, when determining reduction pixel candidates using the reference difference values, the mask value setting unit 415 does not determine pixels whose pixel values are "0" to be reduction pixel candidates.

Brief explanation will be also provided here for the fact that, in Equation (3), "(difference-absolute-value cumulative value at position of 'o')×(multi-value at position of 'o')" is not used but "G×((difference-absolute-value cumulative value at position of 'o')×(multi-value at position of 'o'))/100)" is used. As represented in Equation (3), the value of "(difference-absolute-value cumulative value at position of 'o')×(multi-value at position of 'o')" is a value in a class different from that of "(multi-value at position of 'o')", which is the original value before subtraction, for example, by a single-digit number or double digit number. On the basis of this fact, the reference difference value calculating unit 414 performs a multiplication by "1/100" or "G" to reduce the difference between the class of "(multi-value at position of 'o')" and the class of "(difference-absolute-value cumulative value at position of 'o'))×(multi-value at position of 'o')". In other words, by using "1/100" or "G", the degree of influence on the "multi-value at position of 'o'" is controlled when subtracting "(difference-absolute-value cumulative value at position of 'o')×(multi-value at position of 'o')".

Hereinafter, a case is explained in which the reference difference value calculating unit 414 multiplies "((difference-absolute-value cumulative value at position of 'o')×(multi-value at position of 'o'))" by "1/100" and "G=0.5". However, the present invention is not limited to this. The user may set an arbitrary value. For example, "1/90" may be used for multiplication instead of "1/100".

There now follows further explanation of the reference difference value calculating unit 414. For example, when the reference difference value calculating unit 414 calculates reference difference values for the data illustrated in FIG. 7, the data illustrated in FIG. 8 is obtained. FIG. 8 is a diagram illustrating an example of data after the calculation of reference difference values. Each rectangle illustrated in FIG. 8 corresponds to a pixel. The values on the respective rectangles represent basic reference difference values that are calculated by the reference difference value calculating unit 414. For example, when a pixel value in FIG. 3 is "0", the reference difference value calculating unit 414 calculates a reference difference value of "0" as illustrated in FIG. 8. Furthermore, when a pixel value in FIG. 3 is "1" and the difference-absolute-value cumulative value in FIG. 7 is "140", the reference difference value calculating unit 414 calculates a reference difference value of "3", as illustrated in FIG. 8.

The mask value setting unit 415 sets a "mask value" that represents whether each of the pixels forming the binary image is a reduction-pixel candidate. Specifically, for example, the mask value setting unit 415 sets mask values of "1" for pixels that are reduction pixel candidates and sets mask values of "0" for pixels other than pixels that are reduction pixel candidates. In other words, the mask value setting unit 415 determines reduction pixel candidates out of the pixels that form the binary image.

The mask value setting unit 415 sets mask values of "1" for pixels, out of the pixels forming the binary image, for which reference difference values larger than a predetermined threshold are calculated. The mask value setting unit 415 further sets a mask value of "0" for pixels, out of the pixels forming the binary image, that are not the pixels for which reference difference values larger than the predetermined threshold are calculated. For example, when "((difference-absolute-value cumulative value at position of 'o')×(multi-value at position of 'o')" is multiplied by "1/100" and "G=0.5" as described above, the mask value setting unit 415 uses "5" as the predetermined threshold.

Accordingly, for example, when the mask value setting unit 415 performs the process on the data illustrated in FIG. 8, the data illustrated in FIG. 9 is obtained. FIG. 9 is a diagram illustrating an example of data after reduction pixel candidates are determined in the second embodiment. Each rectangle illustrated in FIG. 9 corresponds to a pixel. The values on the respective rectangles illustrated in FIG. 8 represent mask values that are set by the mask value setting unit 415. For example, when the difference-absolute-value accumulative value is "3" in FIG. 8, the mask value setting unit 415 sets a mask value of "0", as illustrated in FIG. 9. When the difference-absolute-value accumulative value is "7" in FIG. 8, the mask value setting unit 415 sets a mask value of "1", as illustrated in FIG. 9. The rectangles that represent the pixels for which the mask values of "1" are to be set or have been set are colored in gray in FIGS. 8 and 9 to make them easier to identify.

Figure 10A:
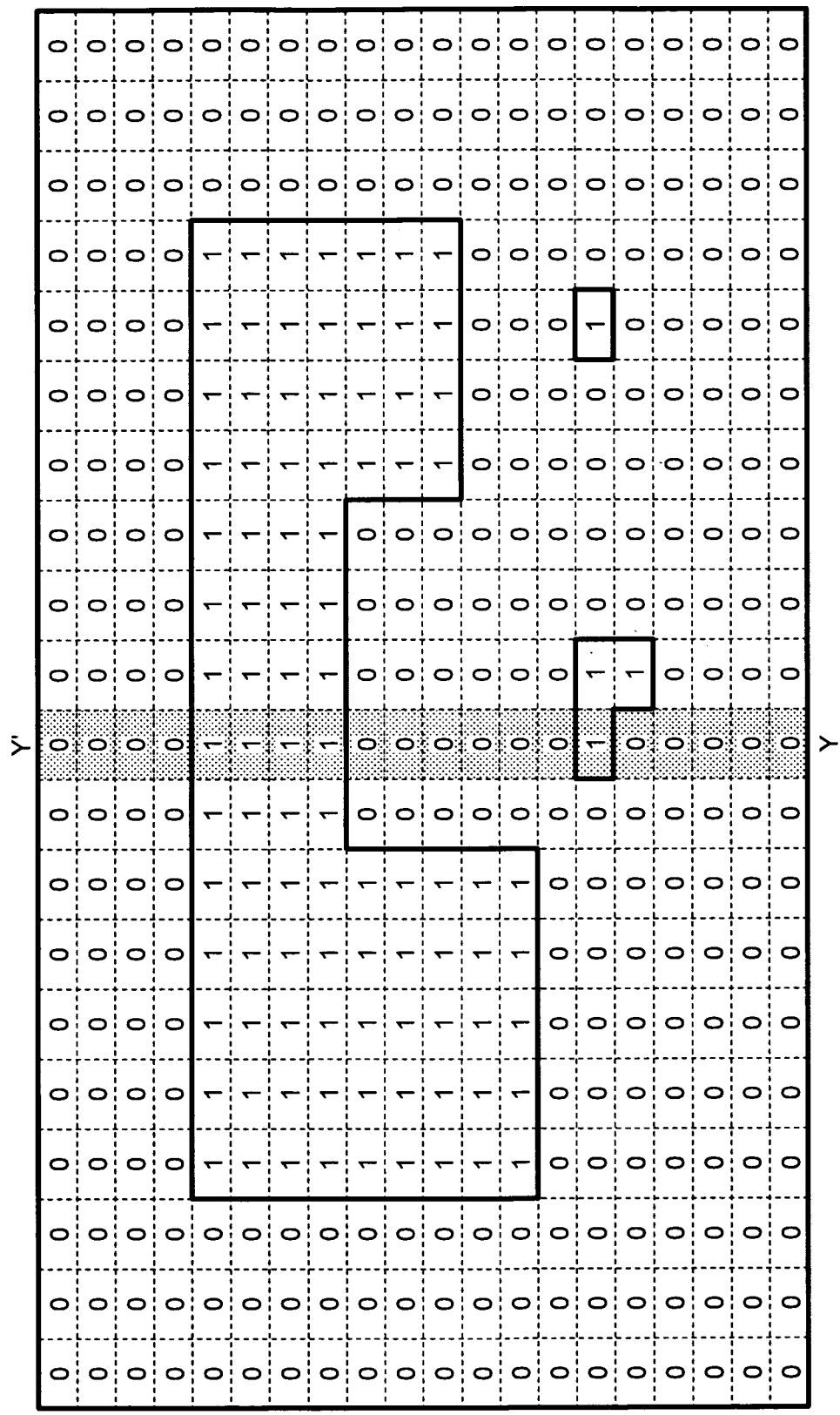
FIG. 10A is a diagram illustrating a process that is performed by a reduction pixel candidate determining unit in the second embodiment.

The process that is performed by the reduction pixel candidate determining unit 410 will be further explained below with reference to FIGS. 10A and 10B. FIGS. 10A and 10B are diagrams illustrating the process that is performed by the reduction pixel candidate determining unit in the second embodiment. FIG. 10A illustrates an example of a binary image. FIG. 10B illustrates an example of a value that is calculated by the reduction pixel candidate determining unit 410 for the pixels on the line extending from "Y" to "Y'" in FIG. 10A. In FIG. 10B, the vertical axis in each diagram represents the pixel value and the horizontal axis in each diagram represents the pixel position. The same position in the horizontal axis in (1) to (6) of FIG. 10B represents the value that is calculated for the same pixel.

The "pixel values" of the respective pixels on the line extending from "Y" to "Y'" are represented in (1) in FIG. 10B. The reduction pixel candidate determining unit 410 then calculates "multi-values" for the respective pixels of the binary image as illustrated in (2) in FIG. 10B. The reduction pixel candidate determining unit 410 then calculates "weighting values" for the respective pixels of the binary image, as illustrated in (3) in FIG. 10B. The reduction pixel candidate determining unit 410 then calculates "difference-absolute-value cumulative values" for the pixels of the binary image, as illustrated in (4) in FIG. 10B. The reduction pixel candidate determining unit 410 then calculates "reference difference values" for the respective pixels of the binary image, as illustrated in (5) in FIG. 10B. The reduction pixel candidate determining unit 410 then sets "mask values" for the respective pixels of the binary image, as illustrated in (6) in FIG. 10B. For example, the reduction pixel candidate determining unit 410 sets a mask value of "1" for pixels that have reference difference values that are above the dotted line represented in (5) in FIG. 10B.

Accordingly, the pixels, illustrated in (6) in FIG. 10B, for which the mask values "1" are set, are pixels of the large area excluding the edge and the pixels of the small area, as illustrated in (1) in FIG. 10B and/or FIG. 10A.

There now follows further explanation using FIG. 2. The pattern determining unit 420 determines, on the basis of a predetermined target reduction ratio, a pattern that represents candidate positions that are positions of candidates, out of the pixels that form the binary image, for pixels, whose pixel values are to be reduced. For example, the pattern determining unit 420 determines a pattern in which candidate positions are not adjacent to one another.

The "target reduction ratio" is a ratio of pixels that are determined to be reduction pixels by the reduction pixel determining unit 430, which will be described below, to "all pixels whose pixel values may be reduced" and is a target value that is set by the user. For example, "all pixels whose pixel values may be reduced" correspond to all pixels whose pixel values are "1" out of the pixels in the binary image. Hereinafter, the pattern determining unit 420 will be explained using, as an example, a case in which the target reduction ratio is previously determined by the user. However, the present invention is not limited to this. For example, a target reduction ratio may be set by the user every time the pattern determining unit 420 determines a pattern.

Figures 11A, 11B:
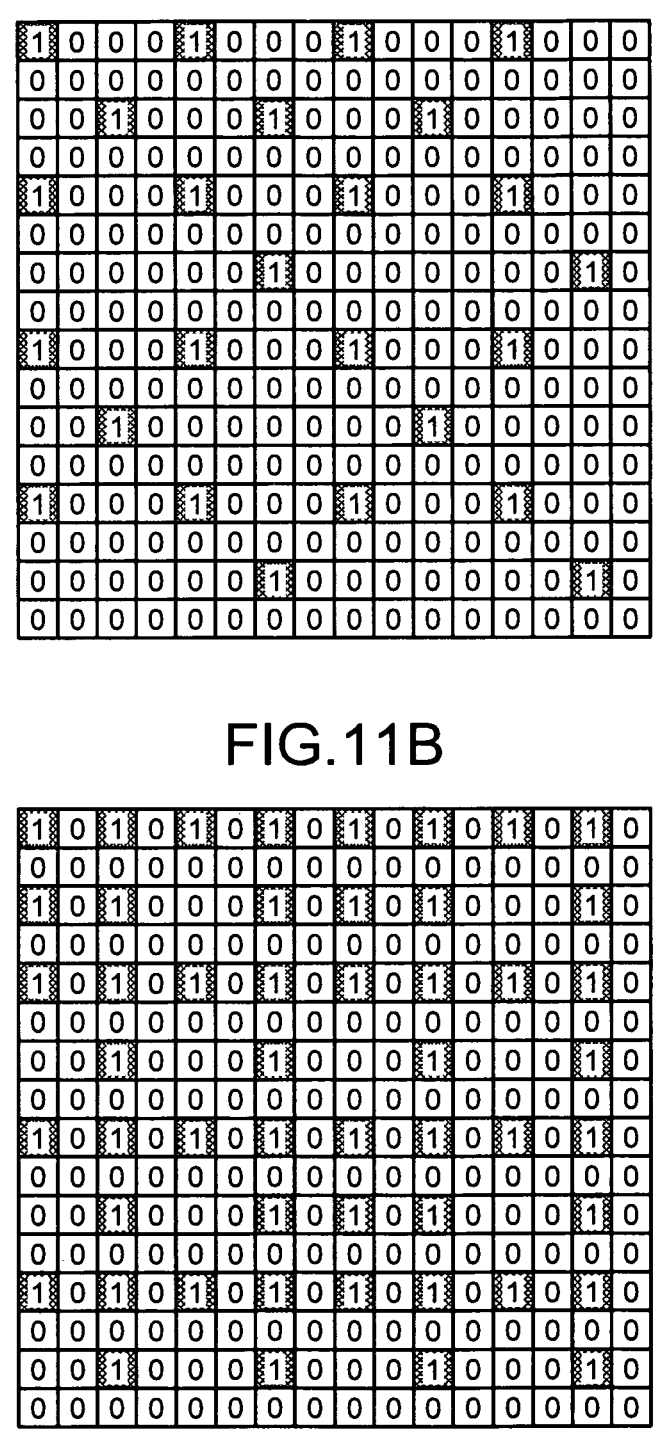
Figures 11C, 11D:
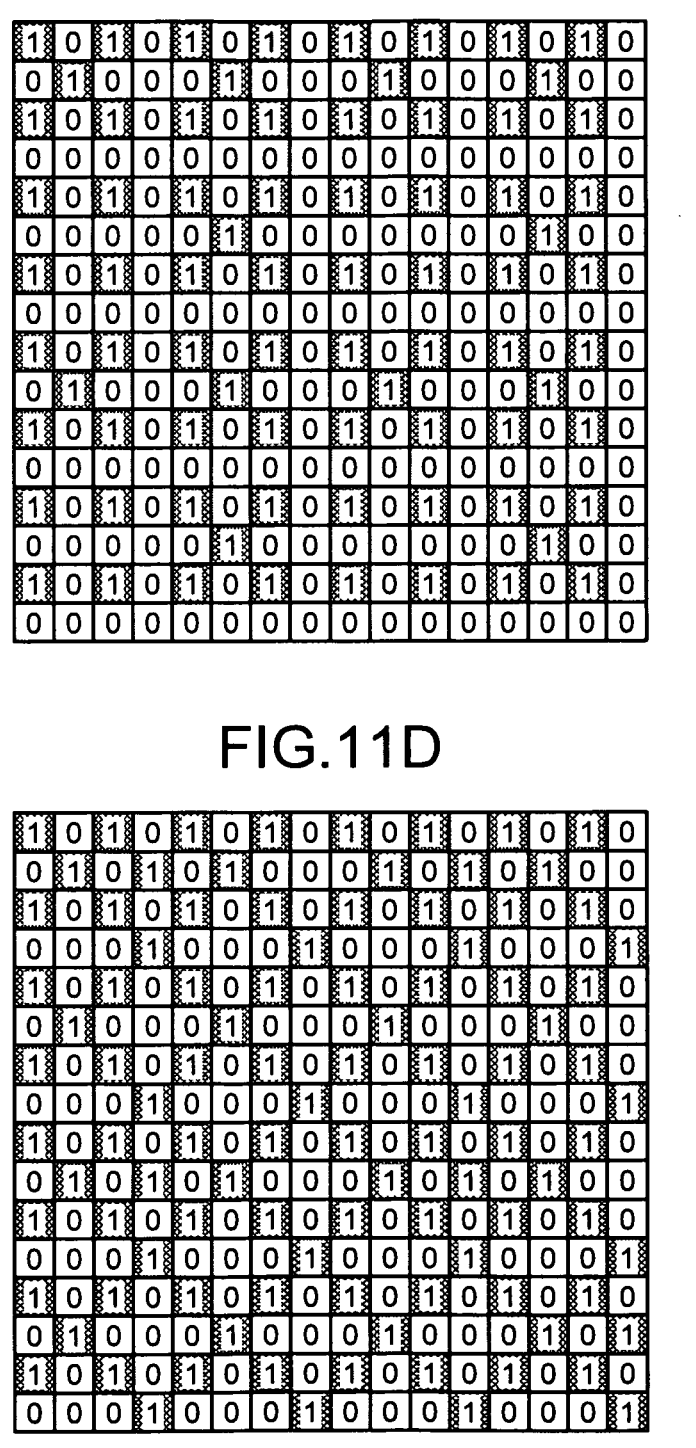

An example of the pattern in a case where a dispersive rearrangement method is used will be explained with reference to FIGS. 11A to 11D. The pattern that is determined using the dispersive rearrangement method corresponds to, for example, the Bayer arrangement. The pattern examples illustrated in FIGS. 11A to 11D are square patterns of 16 pixels in the vertical and 16 pixels in the horizontal and each rectangle corresponds to a pixel. The pixels that correspond to rectangles for which "1" is set represent the positions of the candidates for pixels whose pixel values are to be reduced. FIG. 11A illustrates an example of a pattern in a case in which the target reduction ratio is "10%". FIG. 11B illustrates an example of a pattern in a case where the target reduction ratio is "20%". FIG. 11C illustrates an example of a pattern in a case where the target reduction ratio is "30%". FIG. 11D illustrates an example of a pattern in a case where the target reduction ratio is "40%". In the pattern that is determined in the case where the target reduction ratio is "10%", "10%" pixels of all the pixels that form the binary image correspond to candidate positions.

When the binary image is larger than the pattern, the pattern size may be changed to cover the size of the binary image by arranging patterns together like a grid pattern.

The pattern determining unit 420 may prepare various types of patterns based on the target reduction ratio and determine which one is used out of the prepared patterns. The pattern determining unit 420 may generate a new pattern every time pattern determining unit 420 determines a pattern.

The reduction pixel determining unit 430 determines, as reduction pixels, pixels that are determined to be reduction pixel candidates by the reduction pixel candidate determining unit 410 and are positioned in the candidate positions in the pattern that is determined by the pattern determining unit 420.

Figure 12A:
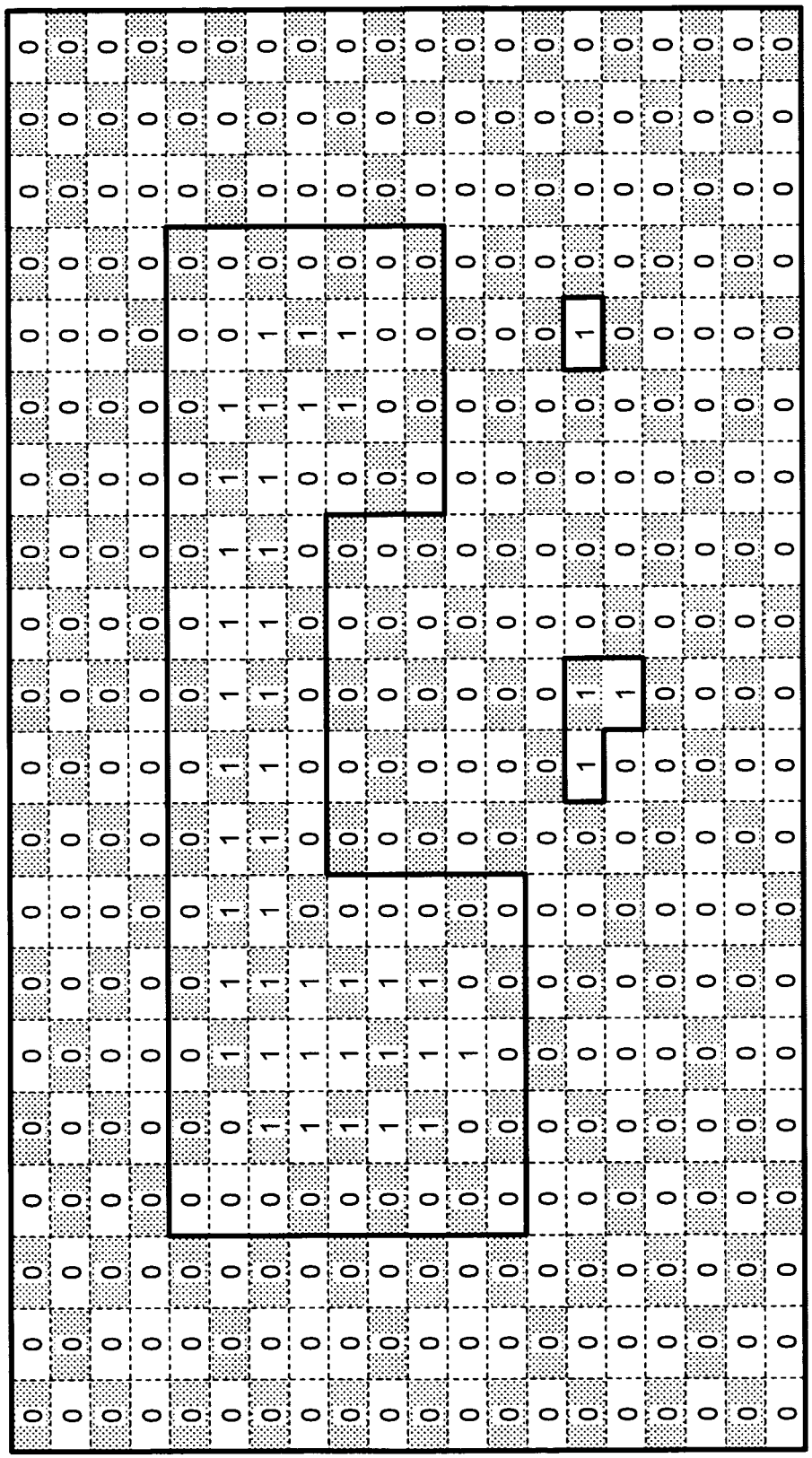
FIG. 12A is a diagram further illustrating a process for determining reduction pixels in the second embodiment.

For example, the process for determining reduction pixels will be further explained with reference to FIGS. 12A and 12B. FIGS. 12A and 12B are diagrams further illustrating the process for determining reduction pixels in the second embodiment. FIG. 12A is a diagram obtained by superimposing the example of the mask values, which are set for the respective pixels of the binary image, illustrated in FIG. 9, on the example of the pattern in the case, illustrated in FIG. 11D, in which the target reduction ratio is "40%". The values on the respective rectangles illustrated in FIG. 12A represent the "mask values" and the darkened pixels, out of the rectangles illustrated in FIG. 12A, represent the "candidate positions". FIG. 12B illustrates the case in which the binary image of FIG. 3 is illustrated but the reduction pixels are not painted.

In the example illustrated in FIG. 12A, the reduction pixel determining unit 430 determines the painted pixels, the mask values for which are "1", to be reduction pixels. Accordingly, as illustrated in (1) in FIG. 12B, the reduction pixel determining unit 430 determines, as reduction pixels, pixels that form an area greater than or equal to a predetermined area and whose pixel values are not different from the neighboring pixels. Furthermore, as illustrated in (2) in FIG. 12B, the reduction pixel determining unit 430 determines, as reduction pixels, pixels that form an area less than or greater than the predetermined area.

More specifically, the reduction pixel determining unit 430 selects one of the pixels that forms the binary image and determines whether the selected pixel is positioned in the candidate position in the pattern. The reduction pixel determining unit 430 determines whether the selected pixel has been determined to be a reduction-pixel candidate. When the reduction pixel determining unit 430 determines that the selected pixel is positioned in a candidate position in the pattern and that the selected pixel has been determined to be a reduction-pixel candidate, the reduction pixel determining unit 430 determines the selected pixel to be a reduction pixel. In contrast, when the reduction pixel determining unit 430 determines that the selected pixel is not positioned in a candidate position in the pattern or that the selected pixel has no been determined to be a reduction-pixel candidate, the reduction pixel determining unit 430 determines the selected pixel to be a pixel other than reduction pixels.

The reduction pixel determining unit 430 determines whether all the pixels that form the binary image have been selected. When the reduction pixel determining unit 430 determines that all the pixels have been selected, it completes the determining process. In contrast, when the reduction pixel determining unit 430 determines that not all the pixels have been selected, the reduction pixel determining unit 430 selects another pixel and continues the determining process.

The reduction processing unit 440 reduces the pixel values of the reduction pixels and outputs the binary image with the reduced pixel values. For example, the reduction processing unit 440 changes the pixel value of a reduction pixel from "1" to "0". For example, the reduction processing unit 440 sets the binary image such that the intensity of the reduction pixels are smaller than those of pixels other then reduction pixels whose pixel values are "1".

For example, the reduction processing unit 440 transmits the binary image with the reduced pixel values to the I/O control I/F unit 203. The I/O control I/F unit 203 sends the binary image with the reduced pixel values to the output unit 202. The output unit 202 then outputs the binary image to the image printing apparatus.

The output apparatus 200 may be implemented using an information processing apparatus, such as a conventional personal computer, a work station, a server, a mobile phone, a personal handy-phone system (PHS) terminal device, a mobile communication terminal device, and a personal digital assistant (PDA). The output apparatus 200 may be implemented using an image printing apparatus, such as a printer or a multi-function machine.

For example, the output apparatus 200 may be implemented by incorporating, in an image printing apparatus, such as a printer or a multi-function machine, the functions of the binary image storage unit 301, the reduction pixel candidate determining unit 410, the pattern determining unit 420, the reduction pixel determining unit 430, and the reduction processing unit 440 that are illustrated in FIG. 2. In this case, for example, when the output apparatus 200 receives a binary image from an external information processing device, such as a personal computer, the output apparatus 200 determines reduction pixels and prints an image after reducing the pixel values of the reduction pixels.

Furthermore, for example, the output apparatus 200 may be implemented by incorporating, in a server, the functions of the units illustrated in FIG. 2. In this case, when the server receives a binary image and a target reduction ratio from a client, the server determines reduction pixels and reduces the pixel values of the reduction pixels. The server sends back the binary image with the reduced pixel values to the client or prints the binary image with the reduced pixel values using a printer or a multi-function machine. The printed image products are posted to the client by the manager who manages the server. The server may be a printer server that is an integrated server and printer.

Flow of Whole Process Performed by Image Output Apparatus

Figure 13:
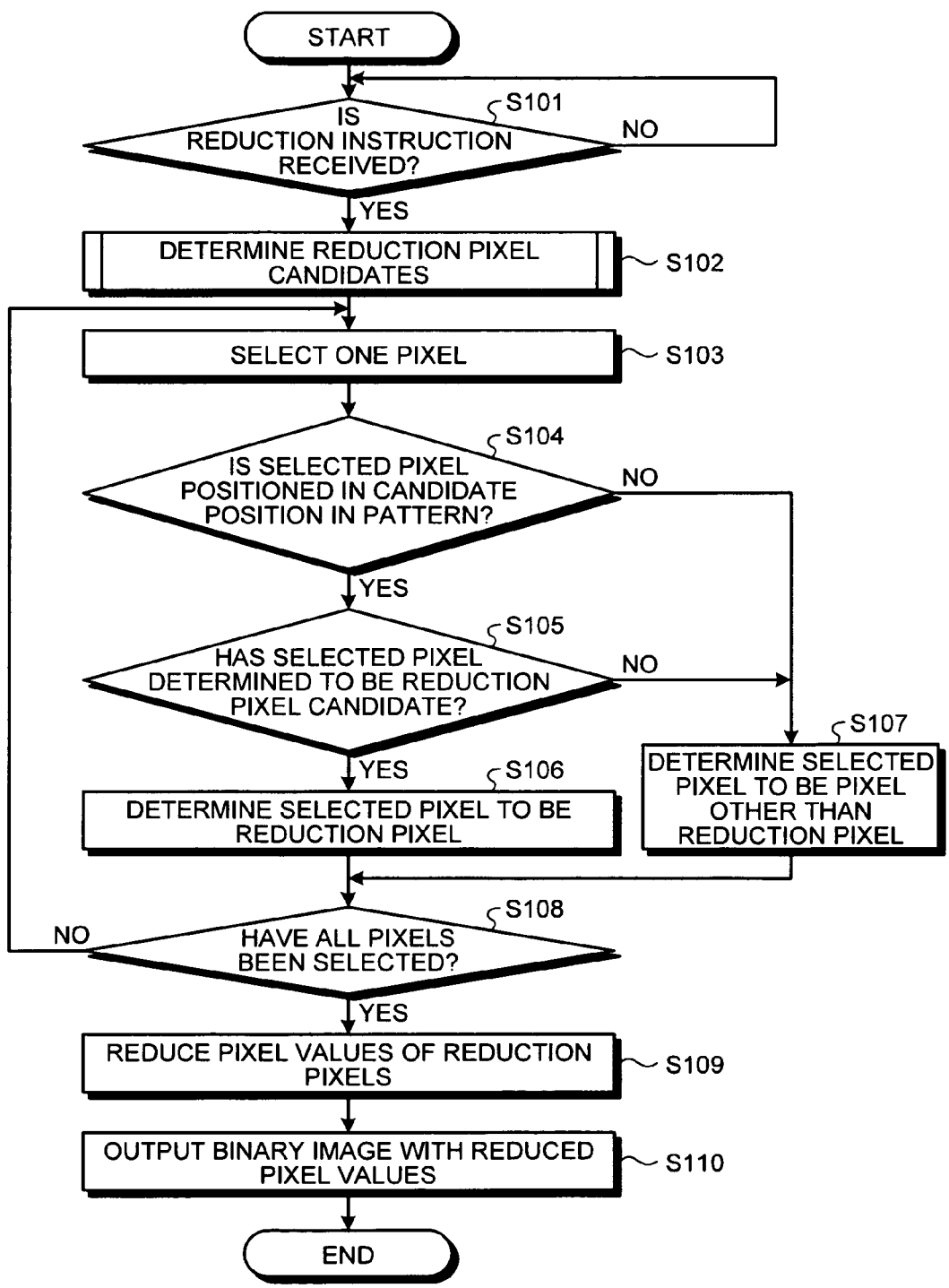
FIG. 13 is a flowchart illustrating an example of a flow of whole processes that are performed by the output apparatus according to the second embodiment.

An example of a flow of whole processes that are performed by the output apparatus 200 according to the second embodiment will be explained with reference to FIG. 13. FIG. 13 is a flowchart illustrating an example of an flow of whole processes that are performed by the output apparatus according to the second embodiment.

As illustrated in FIG. 13, upon receiving a reduction instruction from a user (YES at step S101), the output apparatus 200 determines candidates for reduction pixels whose pixel values are to be reduced out of the pixels that form a binary image (step S102).

The reduction pixel determining unit 430 then selects one of the pixels that form the binary image (step S103). The reduction pixel determining unit 430 determines whether the selected pixel is positioned in a candidate position in a pattern (step S104) and determines whether the selected pixel has been determined to be a reduction pixel candidate (step S105).

When the reduction pixel determining unit 430 determines that the selected pixel is positioned in a candidate position in the pattern and that the selected pixel has been determined to be a reduction pixel candidate (YES at step S104 and YES at step S105), the reduction pixel determining unit 430 determines the selected pixel to be a reduction pixel (step S106). In contrast, when the reduction pixel determining unit 430 determines that the selected pixel is not positioned in a candidate position in the pattern or that the selected pixel has not been determined to be a reduction pixel candidate (NO at step S104 and No at step S105), the reduction pixel determining unit 430 determines that the selected pixel is a pixel other than reduction pixels (step S107).

The reduction pixel determining unit 430 then determines whether all the pixels that form the binary image have been selected (step S108). When the reduction pixel determining unit 430 determines that all the pixels have been selected (YES at step S108), it completes the process. The reduction processing unit 440 then reduces the pixel values of the reduction pixels (step S109) and outputs the binary image with the reduced pixel values (step S110). When the reduction pixel determining unit 430 determines that not all the pixels forming the binary image have been selected (NO at step S108), it goes back to step S103 and continues the process (steps S103 to S108).

The above-described procedure is not limited to the above-described order. The order may be changed unless it causes contradiction in the process contests. For example, step S104 and step S105 may be performed in an inverse order.

Figure 14:
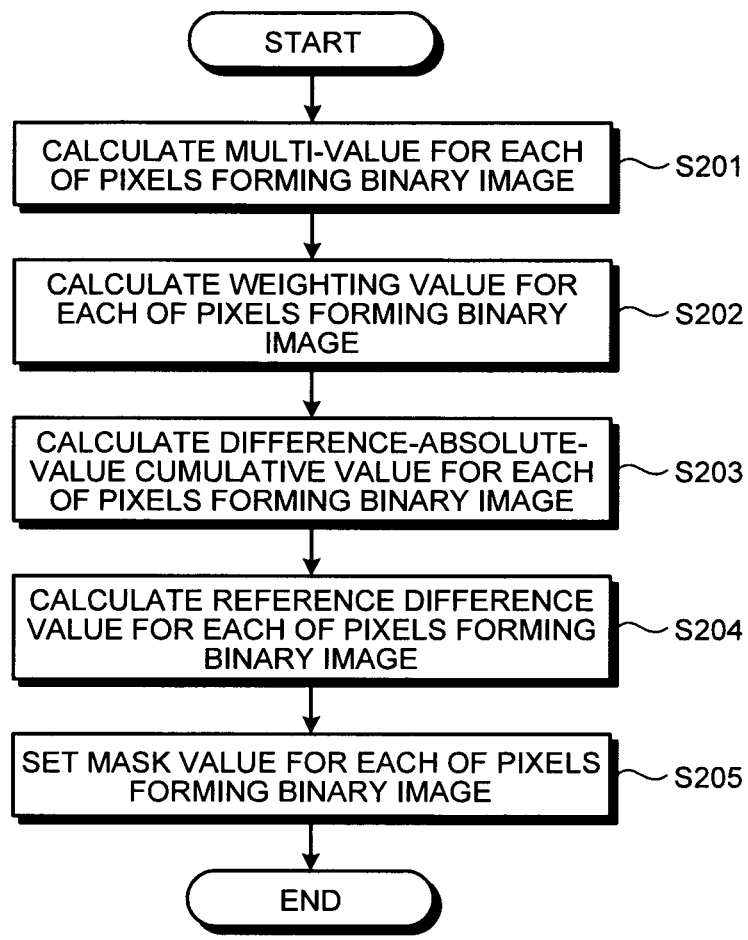
FIG. 14 is a flowchart illustrating an example of a flow of a process that is performed by a reduction pixel candidate determining unit in the second embodiment.

Flow of Process Performed by Reduction Pixel Candidate Determining Unit in Second Embodiment An example of the flow of the process that is performed by the reduction pixel candidate determining unit 410 in the second embodiment will be explained below with reference to FIG. 14. FIG. 14 is a flowchart illustrating an example of the flow of the process that is performed by the reduction pixel candidate determining unit. The process illustrated in FIG. 14 corresponds to step S102 illustrated in FIG. 13.

As illustrated in FIG. 14, when determining reduction pixel candidates, the multi-value calculating unit 411 calculates, for each of the pixels forming the binary image, a "multi-value" that is obtained by multiplying a pixel value by a predetermined value (step S201). For example, when the multi-value calculating unit 411 performs the multi-value process using "10" as a predetermined value, the multi-value calculating unit 411 calculates a multi-value of "10" for a pixel whose pixel value is "1" and calculates a multi-value of "0" for a pixel whose pixel value is "0".

The weighting value calculating unit 412 calculates, for each of the pixels forming the binary image, a "weighting value" using the above-described Equation (1) (step S202). For example, when the multi-value of a pixel of interest is "10" and the multi-values of pixels that are covered by a size of 3×3 are all "10", the weighting value calculating unit 412 calculates a weighting value of "90".

The difference-absolute-value cumulative value calculating unit 413 calculates, for each of the pixels forming the binary image, a "difference-absolute-value cumulative value" using the above-described Equation (2) (step S203). For example, when the multi-value of a pixel of interest is "90" and the multi-values of pixels that are covered by a size of 3×3 are all "90", the difference-absolute-value cumulative value calculating unit 413 calculates a difference-absolute-value cumulative value of "0".

The reference difference value calculating unit 414 calculates, for each of the pixels forming the binary image, a "reference difference value" using the above-described Equation (3) (step S204). For example, when the pixel value is "1" and the difference-absolute-value cumulative value is "140", the reference difference value calculating unit 414 calculates a reference difference value of "3".

The mask value setting unit 415 then sets, for each of the pixels forming the binary image, a mask value that represents whether a pixel is determined to be a reduction pixel candidate (step S205). In other words, the mask value setting unit 415 determines reduction pixel candidates out of the pixels that form the binary image.

Effects of Second Embodiment

As described above, in the second embodiment, the output apparatus 200 determines, as reduction pixels, pixels that form an area equal to or greater than a predetermined size and whose pixel values are not different from those of neighboring pixels and pixels that form an area not equal to or greater than the predetermined size. The output apparatus 200 reduces the pixel values of the determined reduction pixels and outputs the binary image with the reduced pixel values. Accordingly, the image quality can be maintained and the consumption of toner can be reduced.

For example, the intensity of black pixels excluding those at an edge is reduced. As a result, the edge remains and image quality can be maintained while consumption of toner or ink is reduced.

For example, the intensity of black pixels that form small dots (black area not equal to or greater than a predetermined size) in a gray area is reduced. Accordingly, even when there is a gray area, consumption of toner can be reduced. In other words, the amount of toner to be reduced can be inhibited from being decreased for a binary image with a higher ratio of edge in which dots are scattered.

In the second embodiment, the output apparatus 200 calculates, for each pixel, a reference difference value and then determines reduction pixel candidates. In other words, the output apparatus 200 performs a process for calculating a reference difference value for each pixel and accordingly determines, as reduction pixel candidates, pixels in a large area excluding the edge pixels, but does not perform a detection process for detecting an edge; therefore, the process load can be maintained uniform. In other words, in a case in which a process for detecting an edge is performed, if a large area is contained, the detection process is not completed until the edge detection is performed for the entire circumference of the large area, which increases the process load. In contrast, in the second embodiment, the process load can be always equivalent to the load of the process for determining reduction pixel candidates regardless of the amount of edge.

In the second embodiment, the weighting value calculating unit 412 calculates, for each of the pixels forming the binary image, a weighting value by calculating a sum obtained by summing the pixel value of a pixel of interest and the pixel values of a predetermined number of pixels neighboring the pixel of interest. The difference-absolute-value cumulative value calculating unit 413 calculates, for each of the pixels forming the binary image, a difference-absolute-value cumulative value by calculating a difference value between a weighting value of a pixel and a weighting value that is calculated for each of a predetermined number of neighboring pixels and by summing the calculated differences. Accordingly, weighting values larger than those for other areas can be obtained for an area having a certain area (area larger than the area having the size used as an area containing neighboring pixels).

The weighting values that are calculated for the pixels at an edge are smaller than weighting values for internal pixels. However, the difference between the weighting values of the pixels at the edge and weighting values of the pixels outside the area remains (see FIG. 6 and (3) in FIG. 10B). On the basis of the fact, the output apparatus 200 excludes, from the reduction pixel candidates, pixels that have weighting values largely different from those of the neighboring pixels, i.e., pixels that are in the important positions for forming the image and form a certain area. The output apparatus 200 also determines, as reduction pixel candidates, pixels that have a small difference between its weighting value and each of weighting values for neighboring pixels. Accordingly, low pixel values can be set for pixels in an area other than areas that have the certain area, i.e., the dot pixels.

In other words, calculation of weighting values by the weighting value calculating unit 412 corresponds to the process for blurring the vicinity of an edge and calculation of difference values by the difference-absolute-value cumulative value calculating unit 413 corresponds to a process for determining a pixel area that should be positioned in the vicinity of the edge.

In the second embodiment, the output apparatus 200 determines a pattern that represents candidate positions that are positions of candidates, out of the pixels that form the binary image, for pixels that are candidates for pixels whose pixel values are to be reduced. The output apparatus 200 determines, as reduction pixels and out of the pixel forming the binary image, pixels that are reduction pixel candidates and are positioned in candidate positions in the pattern. In this manner, by determining reduction pixels using a pattern, the ratio of pixels whose pixel values are to be reduced can be determined in accordance with a target reduction ratio.

In the second embodiment, the output apparatus 200 determines a pattern in which candidate positions are not adjacent to one another. By reducing the pixels values of adjacent pixels, the image quality can be prevented from reduced.

[c] Third Embodiment

A case has been described, as the second embodiment, in which the pattern determining unit 420 determines a pattern on the basis of a target reduction ratio that is set by the user. However, the present invention is not limited to this. Specifically, a pattern may be determined on the basis of a target reduction ratio and an actual reduction ratio that represents an actual ratio of reduction in consumption.

Hereinafter, a case will be explained, as a third embodiment of the present invention, in which a pattern is determined on the basis of an actual reduction ratio and a target reduction ratio. The points similar to those in the second embodiment will be briefly explained or explanation for which will be omitted below.

Configuration of Output Apparatus According to Third Embodiment

Figure 15:
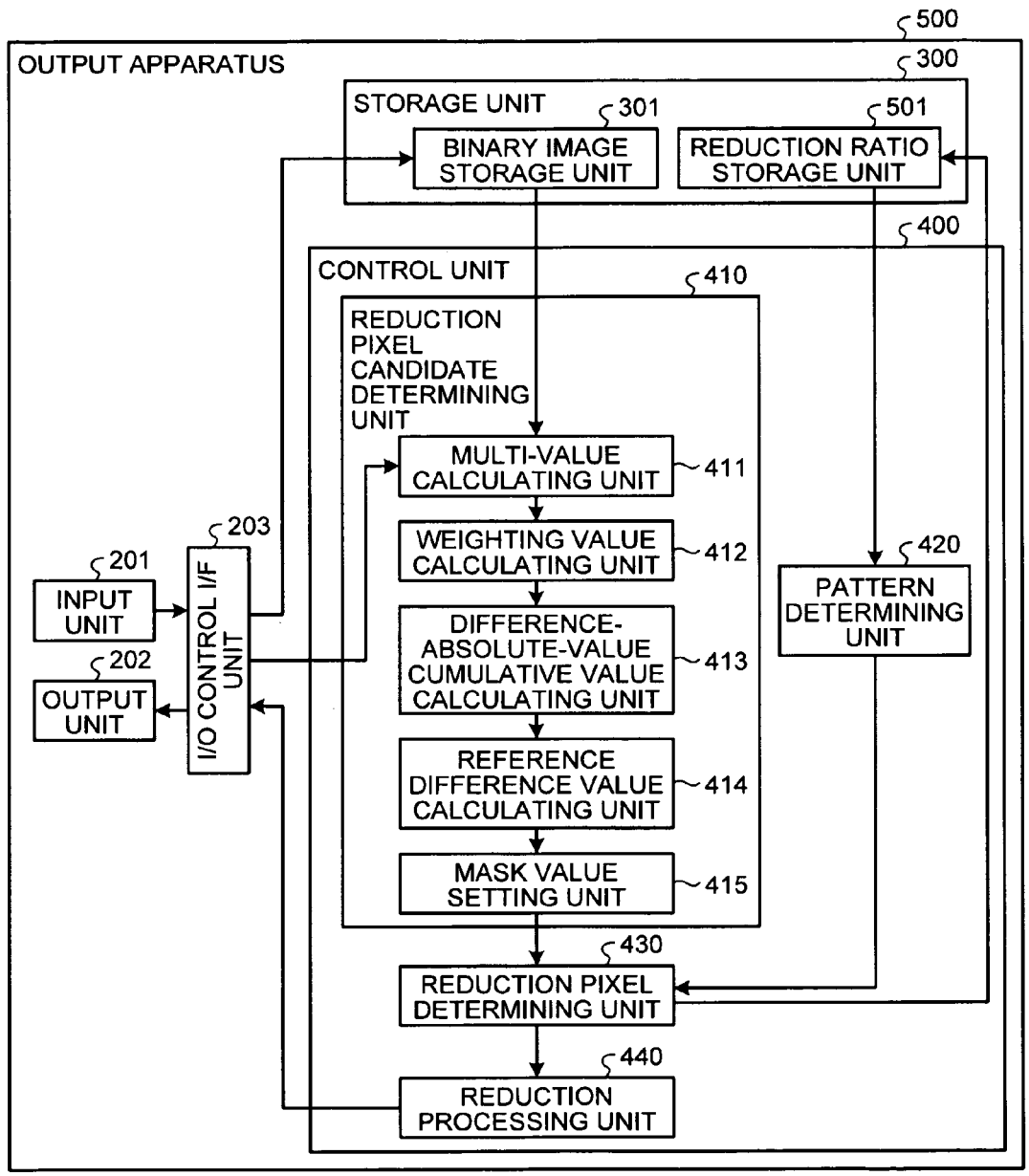
FIG. 15 is a block diagram illustrating an example of a configuration of an output apparatus according to a third embodiment of the preset invention.

A configuration of an output apparatus 500 according to the third embodiment will be explained below with reference to FIG. 15. FIG. 15 is a block diagram illustrating an example of a configuration of the output apparatus according to the third embodiment. As illustrated in FIG. 15, the output apparatus 500 further includes a reduction ratio storage unit 501 in addition to the components of the output apparatus 200 according to the second embodiment (see FIG. 2).

Figures 16, 17:
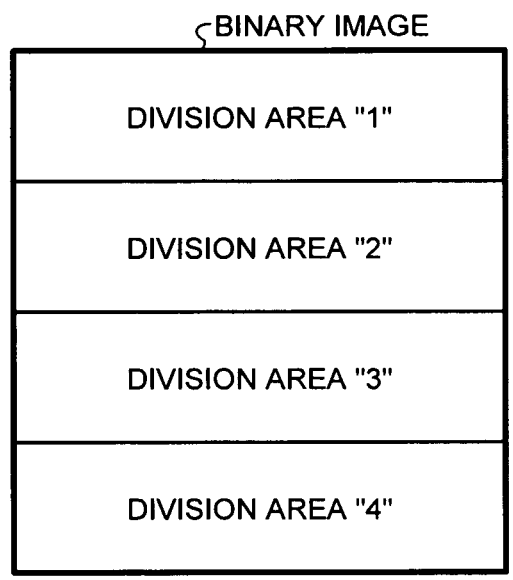
FIG. 16 is a diagram illustrating an example of a binary image that is divided into multiple division areas.
FIG. 17 is a diagram illustrating an example of information that is stored in a reduction ratio storage unit.

In the third embodiment, as described below, the reduction pixel determining unit 430 divides a binary image into multiple division areas and determines reduction pixels for each of the division areas. An example of a binary image that is divided into multiple areas will be explained with reference to FIG. 16. FIG. 16 is a diagram illustrating an example of a binary image that is divided into multiple division areas. In the case illustrated in FIG. 16, the reduction pixel determining unit 430 divides a binary image into four division areas. In the example illustrated in FIG. 16, the reduction pixel determining unit 430 divides the binary image into division areas "1" to "4".

In the example illustrated in FIG. 16, there are four division areas to make them easier to identify. Alternatively, the number of division areas may be set arbitrarily. Furthermore, the shape of each division area is not limited to the shape illustrated in FIG. 16, i.e., the shape is not limited to the shape obtained by dividing an image not in the line direction but in the direction orthogonal to the line direction. The shape can be arbitrarily set. The process, which will be explained below, may change a reduction ratio for each division area. The width of a division area may be equivalent to that of 16 lines such that changes in an output print due to variations in reduction ratio between the division areas are unnoticeable to human eyes. Determination of the width does not necessarily depend on the number of lines. The width may be determined by an actual width on an output result, such as a width equal to or greater than 0.1 mm on the sheet surface that is the output result.

On the basis of the fact that reduction pixels are determined for each of multiple division areas, each component will be explained below. As illustrated in FIG. 17, the reduction ratio storage unit 501 stores target reduction ratios and also stores actual reduction ratios in association with "rail numbers" that specify division areas, respectively. The rail number "1" represents a division area "1". FIG. 17 is a diagram illustrating an example of information that is stored in the reduction ratio storage unit. In the example illustrated in FIG. 17, an actual reduction ratio for the rail number "1" is stored and no actual reduction ratios are stored for rail numbers "2" to "4".

In the example illustrated in FIG. 17, the reduction ratio storage unit 501 stores a target reduction ratio of "20%" and stores an actual reduction ratio of "15%" in association with the rail number "1". The target reduction ratio that is stored in the reduction ratio storage unit 501 is input by a user previously, and the actual reduction ratio that is associated with a rail number is stored by the reduction pixel determining unit 430 as described below.

The pattern determining unit 420 determines a pattern for each of the division areas. Each time the pattern determining unit 420 determines a new pattern, the pattern determining unit 420 sends the determined pattern to the reduction pixel determining unit 430. The process for determining a pattern, which is performed by the pattern determining unit 420, will be further explained. When determining a pattern for the first time, the pattern determining unit 420 determines a pattern on the basis of a target reduction pixel as in the first embodiment. Thus, explanation will be provided for a process for determining a pattern for the second and subsequent times, which is performed by the pattern determining unit 420. In other words, the process corresponds to the process that is performed, for example, after reduction pixels have been already determined for the division area "1" and the reduction pixel determining unit 430 has stored an actual reduction ratio of "15%" in association with the rail number "1".

The pattern determining unit 420 calculates a difference between an actual reduction ratio and a target reduction ratio. For example, if an actual reduction ratio of "15%" is stored in association with the rail number "1" in the reduction ratio storage unit 501, the pattern determining unit 420 calculates a difference "−5%" between the actual reduction ratio "15%" and the target reduction ratio "20%". For example, if the reduction ratio storage unit 501 stores multiple actual reduction ratios, the pattern determining unit 420 calculates an average of all the actual reduction ratios, which are stored in the reduction ratio storage unit 501, and calculates a difference between the calculated average value and the target reduction ratio.

The pattern determining unit 420 determines, on the basis of the calculated difference, a pattern that is used for the second division area on which the process is performed next and which is an area other than the first division area. The "first division area" represents the division area for which the reduction pixel determining unit 430 has determined reduction pixels. For example, when reduction pixels have been already determined for the division area "1", the division area "1" corresponds to the first division area.

Specifically, the pattern determining unit 420 determines whether an actual reduction ratio is in a predetermine range from the target reduction ratio by comparing the calculated difference with a predetermined threshold. For example, when the calculate difference is within "±5%", the pattern determining unit 420 determines that the actual reduction ratio is within the predetermined range from the target reduction ratio. In contrast, when the calculate difference is not within "±5%", the pattern determining unit 420 determines that the actual reduction ratio is not within the predetermined range from the target reduction ratio.

When the pattern determining unit 420 determines that the actual reduction ratio is not within the predetermined range from the target reduction ratio, the pattern determining unit 420 determines whether the actual reduction ratio is greater than the target reduction ratio. For example, the pattern determining unit 420 determines whether the calculated difference is greater than "5%" in the positive direction. When the pattern determining unit 420 determines that the actual reduction ratio is larger than the target reduction ratio, the pattern determining unit 420 sets a low reduction ratio that is used for determining a pattern. For example, when the target reduction ratio is "20%", the pattern determining unit 420 determines a pattern in which "15%" of the pixels that form the image are in candidate positions.

The pattern determining unit 420 sets a higher reduction ratio that is used for determining a pattern when it determines that the actual reduction ratio is not within the predetermined range from the target reduction ratio and does not determine that the actual reduction ratio is not greater than the target reduction ratio, i.e., when the actual reduction ratio is less than the target reduction ratio. For example, when the target reduction ratio is "20%", the pattern determining unit 420 determines a pattern in which "25%" of the pixels that form the image are in candidate positions.

When the pattern determining unit 420 determines that the actual reduction ratio is within the predetermined range from the target reduction ratio, the pattern determining unit 420 determines a pattern on the basis of the target reduction ratio. For example, when the target reduction ratio is "20%", the pattern determining unit 420 determines a pattern in which "20%" of the pixels that form the image are in candidate positions.

The case where "±5%" is used as the predetermined range has been explained above as an example. In this example, when the calculated difference is greater than "5%" in the positive direction, a pattern is determined using a reduction ratio "5%" less than the target reduction ratio. In contrast, when the calculated difference is greater than "−5%" in the negative direction, a pattern is determined using a reduction ratio "5%" greater than the target reduction ratio. However, the present invention is not limited to this. The value can be arbitrarily set by a user of the output apparatus 500. For example, a range narrower than "±5%" or a range wider than "±5%" may be used as the predetermined range. Alternatively, a pattern may be determine using a reduction ratio greater than (or less than) the target reduction ration by an arbitrary value. In other words, the arbitrary value is not limited to the above-described example. The user of the output apparatus 500 may set an arbitrary value.

The reduction pixel determining unit 430 will be explained. The reduction pixel determining unit 430 divides a binary image into multiple division areas. For example, as illustrated in FIG. 16, the reduction pixel determining unit 430 divides a binary image into division areas "1" to "4".

The reduction pixel determining unit 430 determines reduction pixels for each division area using a pattern that is determined for each division area by the pattern determining unit 420. Specifically, the reduction pixel determining unit 430 selects, as the second division area, one division area other than the first division area, i.e., selects one division area for which reduction pixels has not been determined. The reduction pixel determining unit 430 receives a pattern from the pattern determining unit 420. The reduction pixel determining unit 430 then determines reduction pixels for the selected division area using the received pattern.

The reduction pixel determining unit 430 will be explained using an example in which the reduction pixel determining unit 430 determines reduction pixels for the division area "1" and then selects the division area "2". In this case, upon receiving a new pattern from the pattern determining unit 420, the reduction pixel determining unit 430 determines reduction pixels for the division area "2" using the received pattern.

After determining reduction pixels, the reduction pixel determining unit 430 calculates a ratio of the number of the determined reduction pixels to "all pixels whose pixel values may be reduced" in the division area for which reduction pixels are determined. Specifically, the reduction pixel determining unit 430 calculates a value whose denominator is the number of the pixels whose pixel values are "1" out of the pixels in the first division area and the numerator is the number of reduction pixels that are determined for the first division area. For example, after determining reduction pixels for the division area "2", the reduction pixel determining unit 430 calculates an actual reduction ratio of "20%" for the division area "2".

The reduction pixel determining unit 430 then stores the calculated actual reduction ratio in the reduction ratio storage unit 501 in association with the rail number that represents a division area for which reduction pixels have been determined. For example, the reduction pixel determining unit 430 stores the actual reduction ratio of "20%" in association with the rail number "2".

The reduction pixel determining unit 430 determines whether the process has been performed for all the division areas. When the reduction pixel determining unit 430 does not determine that the process has been performed for all the division areas, the reduction pixel determining unit 430 selects, as the second division area, a new division area other than the first division area, and the reduction pixel determining unit 430 repeats the process for determining reduction pixels.

In the above example, the output apparatus 500 divides a binary image into multiple division areas and a pattern is determined for each of the division areas. However, the present invention is not limited to this. For example, the output apparatus 500 may determine a pattern for each binary image. In this case, the output apparatus 500 may determine a pattern on the basis of the actual reduction ratio and the target reduction ratio of the binary image for which reduction pixels was determined for the previous time.

Whole Processes Performed by Output Apparatus According to Third Embodiment

Figure 18:
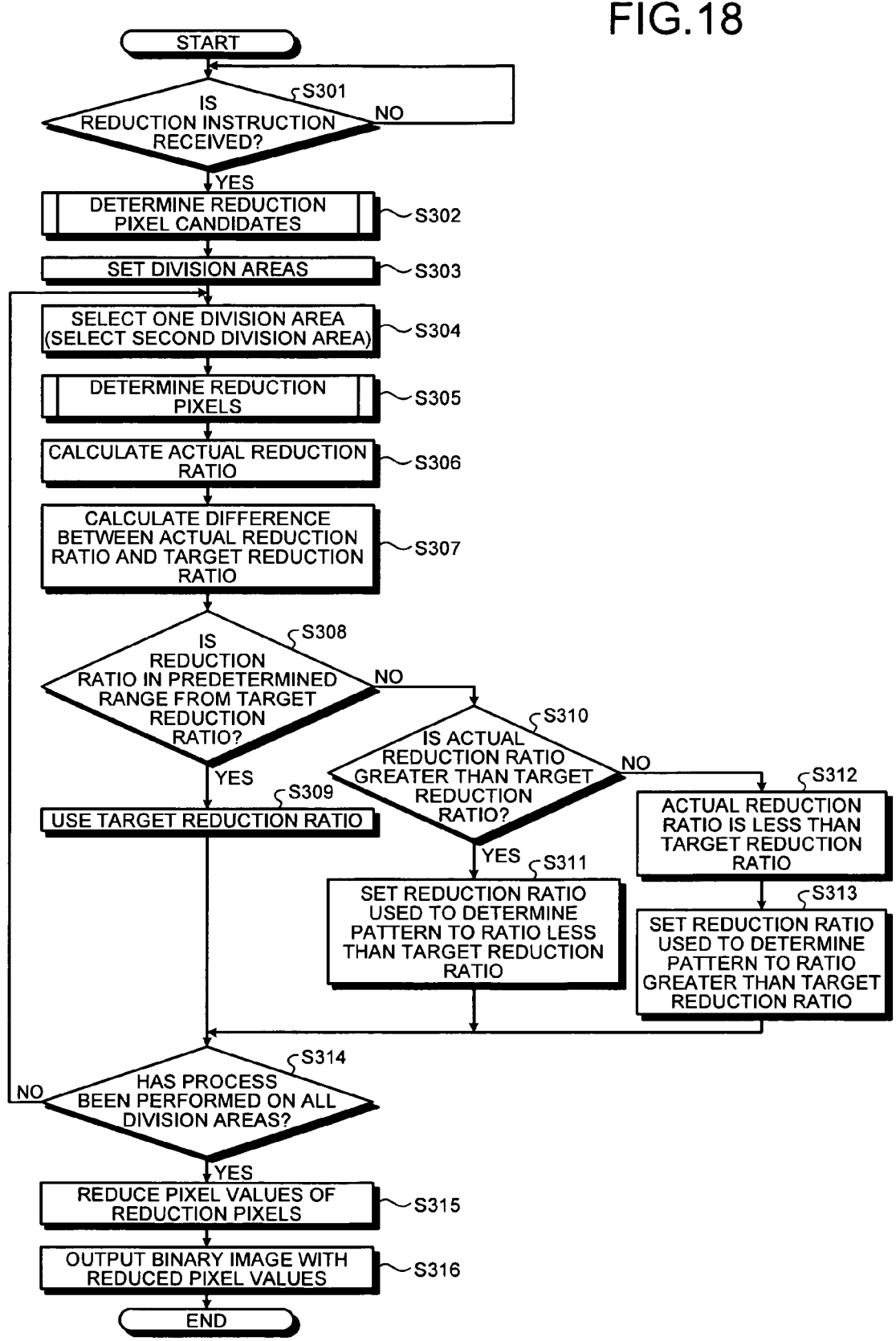
FIG. 18 is a flowchart illustrating an example of a flow of whole processes that are performed by the output apparatus according to the third embodiment.

An example of a flow of whole processes that are performed by the output apparatus 500 according to the third embodiment will be explained below with reference to FIG. 18. FIG. 18 is a flowchart illustrating an example of a flow of whole processes that are performed by the output apparatus according to the third embodiment.

As illustrated in FIG. 18, upon receiving a reduction instruction (step S301), the output apparatus 500 determines reduction pixel candidates (step S302). Note that step S302 illustrated in FIG. 18 corresponds to step S102 illustrated in FIG. 13.

The reduction pixel determining unit 430 divides a binary image into multiple division areas. For example, the reduction pixel determining unit 430 divides a binary image into division areas "1" to "4" (step S303). The reduction pixel determining unit 430 selects, out of the division areas, one division area for which reduction pixels have not been determined (step S304) and determines reduction pixels (step S305). Note that step S305 illustrated in FIG. 18 corresponds to steps S103 to S108 illustrated in FIG. 13. When determining reduction pixels for the first time, the reduction pixel determining unit 430 determines a pattern on the basis of a target reduction ratio.

The reduction pixel determining unit 430 calculates an actual reduction ratio (step S306). Specifically, the reduction pixel determining unit 430 calculates a value whose denominator is the number of pixels whose pixel values are "1" out of the pixels in the first division area and the numerator is the number of reduction pixels that are determined for the first division area. Thereafter, the reduction pixel determining unit 430 stores the calculated actual reduction ratio in the reduction ratio storage unit 501.

The pattern determining unit 420 then calculates a difference between an actual reduction ratio and the target reduction ratio (step S307). For example, when the reduction actual reduction ratio is "15%" and the target reduction ratio is "20%", the reduction pixel determining unit 430 calculates a difference of "−5%".

The pattern determining unit 420 determines whether the actual reduction ratio is within the predetermine range from the target reduction ratio (step S308). When the pattern determining unit 420 determines that the actual reduction ratio is within the predetermined range from the target reduction ratio (YES at step S308), the pattern determining unit 420 determines a pattern on the basis of the target reduction ratio (step S309). For example, when the target reduction ratio is "20%", the pattern determining unit 420 determines a pattern in which "20%" of the pixels that form the image correspond to candidate positions.

In contrast, when the pattern determining unit 420 determines that the actual reduction ratio is not within the range from the target reduction ratio (NO at step S308), the pattern determining unit 420 determines whether the actual reduction ratio is greater than the target reduction ratio (step S310). For example, the pattern determining unit 420 determines whether the calculated difference is greater than "5%" in the positive direction. When the pattern determining unit 420 determines that the actual reduction ratio is greater than the target reduction ratio (YES at step S310), the pattern determining unit 420 sets, as a reduction ratio that is used to determine a pattern, a ratio less than the target reduction ratio (step S311). For example, the pattern determining unit 420 determines a pattern in which "15%" of the pixels forming the image correspond to candidate positions.

When the pattern determining unit 420 does not determine that the actual reduction ratio is greater than the target reduction ratio (NO at step S310), i.e., when the actual reduction ratio is less than the target reduction ratio (step S312), the pattern determining unit 420 sets, as a reduction ratio that is used to determine a pattern, a ratio greater than the target reduction ratio (step S313). For example, the pattern determining unit 420 determines a pattern in which "25%" of the pixels forming the image correspond to candidate positions. Upon determining a new pattern, the pattern determining unit 420 sends the determined pattern to the reduction pixel determining unit 430.

The reduction pixel determining unit 430 determines whether the process has been performed on all the division areas (step S314). When the reduction pixel determining unit 430 does not determine that the process has been performed on all the division areas (NO at step S314), the reduction pixel determining unit 430 selects a new division area as the second division area (step S304) and repeats the process for determining reduction pixels (steps S305 to S314). The pattern that is used at step S305 is the pattern that is determined on the basis of the difference that is calculated at step S307.

When the reduction pixel determining unit 430 determines that the process has been performed on all the division areas (YES at step S314), the reduction processing unit 440 reduces the pixel values of the reduction pixels (step S315) and outputs the binary image with the reduced pixel values (step S316).

The above-described procedure is not limited to the above-described order. The order can be arbitrarily changed unless it causes a contradiction in the process contests. For example, step S302 may be performed after step S304.

Effects of Third Embodiment

In the third embodiment, the output apparatus 500 divides a binary image into multiple division areas and determines reduction pixels for each of the division areas. The output apparatus 500 then calculates an actual reduction ratio and calculates a difference between the actual reduction ratio and a target reduction ratio. On the basis of the calculated difference, the output apparatus 500 determines a pattern that is used for the second division area out of the multiple areas other the first division area. Accordingly, the target reduction ratio is satisfied in the whole binary image.

Depending on the pixel arrangement in the binary image, candidate positions and the positions of reduction pixel candidates hardly coincide, or, inversely, candidate positions and the positions of reduction pixel candidates exactly coincide. In this case, the actual reduction ratio may be greater or less than the target reduction ratio. In other words, the target reduction ratio may not be satisfied. However, in the third embodiment, by adjusting, for each division area, the ratio of candidate positions in the pattern, the target reduction ratio can be satisfied.

[d] Fourth Embodiment

The first to third embodiments according to the present invention have been explained. In addition to the first to third embodiments, the present invention may be carried out in other embodiments. Other embodiments will be described below.

Difference-Absolute-Value Cumulative Value

The method for setting a mask value using a reference difference value has been explained for the embodiment. In other words, the method of determining reduction pixel candidates using reference difference values has been explained. However, the present invention is not limited to this. For example, reduction pixel candidates may be determined using difference-absolute-value cumulative values. Specifically, the mask value setting unit 415 determines reduction pixel candidates on the basis of difference-absolute-value cumulative values that are calculated by the difference-absolute-value cumulative value calculating unit 413. For example, the mask value setting unit 415 determines, as reduction pixel candidates, pixels that have difference-absolute-value cumulative values smaller than a predetermined value.

When reduction pixel candidates are determined using difference-absolute-value cumulative values, in addition to pixels that have pixel values of "1", pixels that have pixel values of "0" may be determined to be reduction pixel candidates. However, for pixels that have pixel values of "0", ink or toner is not used and thus it is assumed that there is no problem even when pixels that have pixel values of "0" are determined to be reduction pixels. For this reason, determination of reduction pixel candidates using difference-absolute-value cumulative values omits the process for calculating reference difference values. Accordingly, the process load can be reduced.

Irregular Pattern

The case has been explained for the embodiment in which the pattern determining unit 420 determines a pattern, in which candidates positions are not adjacent to one another, using the dispersive rearrangement method. However, the present invention is not limited to this. A pattern may be determined using other methods. For example, a pattern in which candidate positions are irregular may be determined. For example, the pattern determining unit 420 may determine candidate positions at random using a random number list.

When printing a gray area, an image printing apparatus, such as a printer, prints small dots with the width of multiple pixels on a white background. In many cases, dots are arranged regularly. When candidate positions are regularly arranged in the pattern, depending on the regularity in dot arrangement, the number of candidate positions that coincide with the positions of reduction pixel candidates may be extremely small or the number of candidate positions that coincide with the positions of reduction pixel candidates may be extremely large.

Thus, the actual reduction ratio may be significantly large or significantly small. However, by determining a pattern in which candidate positions are irregularly arranged, the pattern determining unit 420 can prevent the actual reduction ratio from being extremely large or small.

No Pattern

The case have been explained for the embodiment in which, out of the pixels that form a binary image, pixels that are reduction pixel candidates and that are positioned in candidates positions are determined to be reduction images. However, the present invention is not limited to this and a pattern may not be used. For example, the reduction pixel determining unit 430 may determine all reduction pixel candidates to be reduction pixels or may determine reduction pixels out of reduction pixel candidates at random until the target reduction ratio is satisfied.

Edge Detection Process

The case has been explained for the embodiment in which, without performing a detection process for detecting an edge, reduction pixel candidates are determined by calculating a value for each of the pixels that form a binary image. However, the present invention is not limited to this. For example, the output apparatus may perform an edge detection process using a known edge detection filter and identifies the size of the area that is surrounded by the edge. When the area surrounded by the edge is greater than a predetermined value, the output apparatus determines the area, other the detected edge, to be reduction pixel candidates. When the area surrounded by the edge is less than the predetermined value, the output apparatus determines the area to be reduction pixel candidates regardless of whether it is an edge.

Predetermined Number of Neighboring Pixels

The case has been explained for the embodiment in which pixels that are covered by a size of "3×3" are used as the predetermined number of pixels. However, the present invention is not limited to this. Pixels that are covered by a size greater than "3×3" may be used as the predetermined number of pixels. If the performance of the image printing machine is low, pixels that are covered by a large size may be used as the predetermined number of neighboring pixels. If the size used as an area containing neighboring pixels is small, pixels that form a smaller area may be determined to be reduction pixel candidates.

System Configuration

Among the above-described processes according to the embodiments, the processes that are explained as those that are automatically performed may be manually performed entirely or partly, and the processes that are explained as those that are manually performed may be automatically performed entirely or partly using known methods. For example, the process for determining reduction pixels out of reduction pixel candidates may be performed manually or a pattern may be determined manually.

The process procedures, the control procedures, the specific names, and information containing various types of data and parameters (FIGS. 1 to 18) may be arbitrarily changed unless otherwise stated.

The components of each device illustrated in the drawings are functional concepts and are not required to be physically configured as illustrated in the drawings. In other words, the specific modes of separation or integration of the devices are not limited to those illustrated in the drawings. The devices may be configured in a way that they are entirely or partially separated or integrated functionally or physically on an arbitrary basis in accordance with various loads or how they are used.

For example, the pattern determining unit 420 may be connected as an external device of the output apparatus via a network. In addition, other devices may include the binary image storage unit 301 and the pattern determining unit 420, respectively, and accordingly the binary image storage unit 301 and the pattern determining unit 420 may be connected via a network and work cooperatively, so that the functions of the above-described output apparatus are implemented.

Computer

Figure 19:
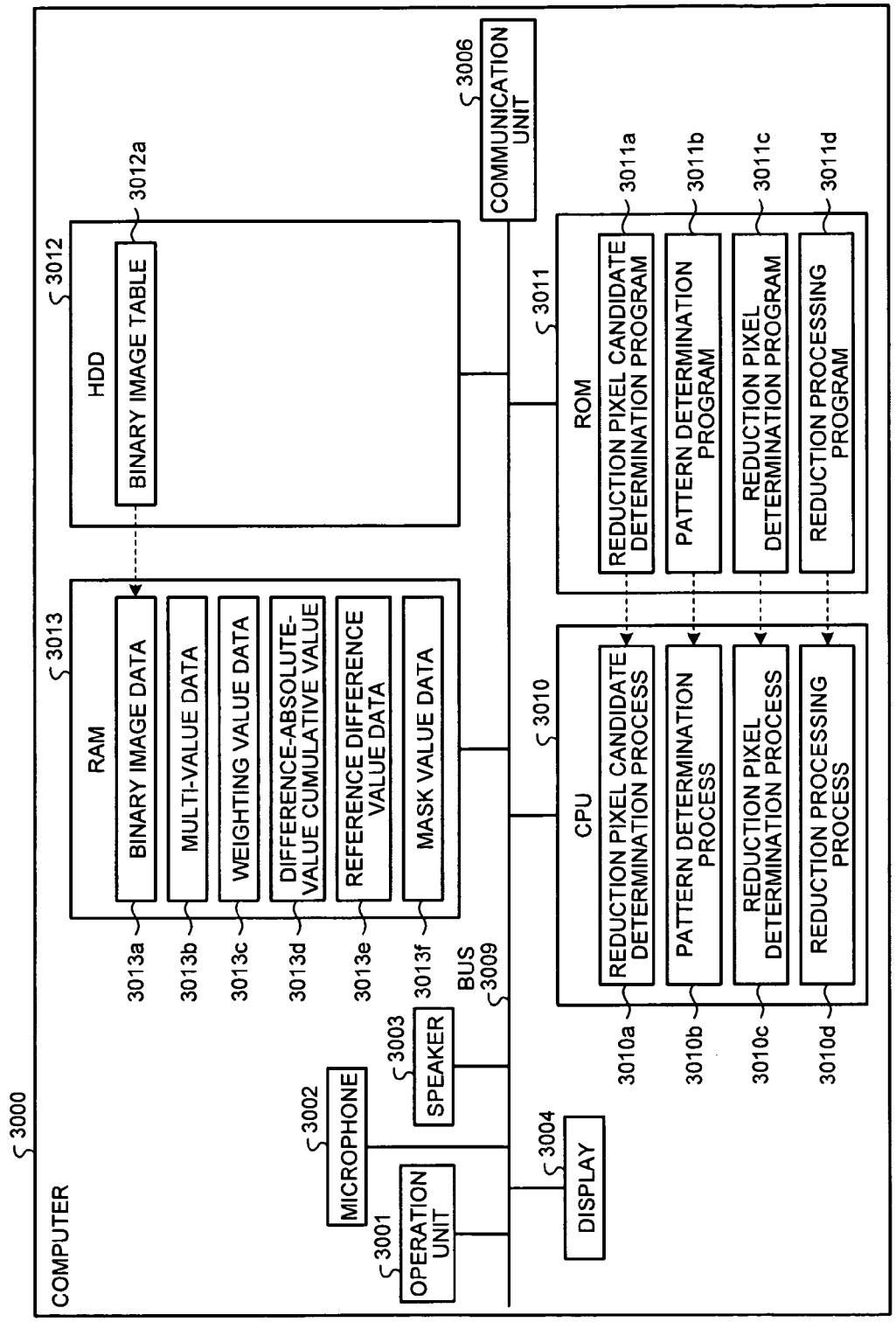
FIG. 19 is a diagram for illustrating an example of a computer that executes an output program according to the second embodiment.

The various types of processes that have been explained in the first to the above-described embodiments may be performed by executing prepared programs on a computer, such as a personal computer and a work station. An example of a computer that executes an output program that implements similar functions as those in the above-described embodiments will be explained below with reference to FIG. 19. FIG. 19 is a diagram illustrating an example of a computer that executes an output program according to the second embodiment.

As illustrated in FIG. 19, a computer 3000 according to the second embodiment is configured by connecting, via a bus 3009, an operation unit 3001, microphone 3002, a speaker 3003, a display 3004, a communication unit 3006, a CPU 3010, a ROM 3011, a hard disk drive (HDD) 3012, and a random access memory (RAM) 3013.

The ROM 3011 previously stores control programs that implement similar functions as those of the reduction pixel candidate determining unit 410, the pattern determining unit 420, the reduction pixel determining unit 430, and the reduction processing unit 440 that are illustrated in the second embodiment. Specifically, as illustrated in FIG. 19, the ROM 3011 stores a reduction pixel candidate determination program 3011a, a pattern determination program 3011b, a reduction pixel determination program 3011c, and a reduction processing program 3011d. The programs 3011a to 3011d may be integrated or separated like the components of the output apparatus 200 illustrated in FIG. 2.

The CPU 3010 reads the programs 3011a to 3011d from the ROM 3011 and executes the programs 3011a to 3011d, so that, as illustrated in FIG. 19, the programs 3011a to 3011d function as a reduction pixel candidate determination process 3010a, a pattern determination process 3010b, a reduction pixel determination process 3010c, and a reduction processing process 3010d. The processes 3010a to 3010d correspond respectively to the reduction pixel candidate determining unit 410, the pattern determining unit 420, the reduction pixel determining unit 430, and the reduction processing unit 440 that are illustrated in FIG. 2.

The HDD 3012 includes a binary image table 3012a. The binary image table 3012a corresponds to the binary image storage unit 301 illustrated in FIG. 2.

The CPU 3010 reads data from the binary image table 3012a and stores the data in the RAM 3013 and executes the output program using binary image data 3013a, multi-value data 3013b, weighting value data 3013c, difference-absolute-value cumulative value data 3013d, reference difference value data 3013e, and mask value data 3013f that are stored in the RAM 3013.

Other Aspects

The output program according to the fourth embodiment may be distributed via a network, such as the Internet. The output program may be stored in a computer-readable storage medium, such as a hard disk, a flexible disk (FD), a CD-ROM, an MO, and a DVD, and may be read and executed by the computer.

According to an aspect of the disclosed output program, consumption of toner or ink can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein an output program causing a computer serving as an information processing apparatus to execute a process comprising:
    calculating, for each of pixels that form a binary image, a first value by summing a pixel value of a pixel of interest and pixel values of a predetermined number of pixels neighboring the pixel of interest;
    calculating, for each of the pixels that form the binary image, a second value by calculating difference values each between the calculated first value of the pixel of interest and the calculated first value of each of the neighboring pixels and summing absolute values of the difference values;
    determining pixel whose second value that is smaller than a predetermined value;
    changing the pixel values of the determined pixels from "1" to "0"; and
    outputting the binary image with the changed pixel values.

2. The non-transitory computer readable storage medium according to claim 1, wherein the process further comprising:
    determining, based on a predetermined reduction ratio, a pattern that represents candidate positions that are positions of candidates for pixels whose pixel values are to be changed, the candidates being out of the pixels that form the binary image, wherein
    the determining the pixels includes determining, out of the pixels that form the binary image, the pixels that have the calculated second values smaller than the predetermined value and are positioned in the candidate positions in the determined pattern.

3. The non-transitory computer readable storage medium according to claim 2, wherein the determined pattern is a pattern in which the candidate positions are arranged to be not adjacent to one another.

4. The non-transitory computer readable storage medium according to claim 3, wherein the process further comprising:
    dividing the binary image into multiple division areas, wherein the determining the pixels includes determining the pixels for each of the division areas obtained at the dividing;
    calculating a ratio of the determined pixels in a first division area that is a division area for which the pixels have been determined; and
    calculating a difference between the calculated ratio and the predetermined reduction ratio, wherein
    the determining the pattern includes determining, based on the difference that is calculated at the calculating a difference, a pattern that is used for a second division area out of the division areas other than the first division area.

5. An information processing apparatus, comprising:
    a calculating unit that calculates, for each of pixels that form a binary image, a first value by summing a pixel value of a pixel of interest and pixel values of a predetermined number of pixels neighboring the pixel of interest;
    a calculating unit that calculates, for each of the pixels that form the binary image, a second value by calculating difference values each between the calculated first value of the pixel of interest and the calculated first value of each of the neighboring pixels and summing absolute values of the difference values;
    a determining unit that determines pixel whose second value that is smaller than a predetermined value;
    a changing unit changes the pixel values of the determined pixels from "1" to "0"; and
    an output unit that outputs the binary image with the changed pixel values.

6. An output method comprising:
    receiving a binary image to be output;
    calculating, for each of pixels that form the received binary image, a first value by summing a pixel value of a pixel of interest and pixel values of a predetermined number of pixels neighboring the pixel of interest;
    calculating, for each of the pixels that form the binary image, a second value by calculating difference values each between the calculated first value of the pixel of interest and the calculated first value of each of the neighboring pixels and summing absolute values of the difference values;

determining pixel whose second value that is smaller than a predetermined value;

changing the pixel values of the determined pixels from "1" to "0"; and outputting the binary image with the changed pixel values to a user terminal.

7. The non-transitory computer readable storage medium according to claim 1, wherein the calculating the second value includes calculating difference values each between the calculated first value of the pixel of interest and the calculated first value of each of the neighboring pixels, summing absolute values of the difference values, and calculating difference value between a pixel value of a pixel of interest and a forth value which is obtained by multiplying the second value and the pixel value of a pixel of interest.

* * * * *